United States Patent [19]

DeJonge

[11] Patent Number: 5,121,325
[45] Date of Patent: Jun. 9, 1992

[54] REQUIRED TIME OF ARRIVAL (RTA) CONTROL SYSTEM

[75] Inventor: Michael K. DeJonge, Kentwood, Mich.

[73] Assignee: Smiths Industries Aerospace & Defense Systems, Inc., Grand Rapids, Mich.

[21] Appl. No.: 726,127

[22] Filed: Jul. 3, 1991

Related U.S. Application Data

[63] Continuation of Ser. No. 504,631, Apr. 4, 1990, abandoned.

[51] Int. Cl.⁵ .............................................. G06F 15/50
[52] U.S. Cl. ................................. 364/442; 364/446; 364/440; 244/182
[58] Field of Search ............... 364/442, 444, 446, 440, 364/431.07; 244/181-183, 189, 76 R

[56] References Cited

U.S. PATENT DOCUMENTS

| Re. 31,962 | 7/1985 | Brodeur | 364/452 |
|---|---|---|---|
| 3,443,073 | 5/1969 | Cohen | 364/446 |
| 4,012,900 | 3/1977 | Enright | 368/97 |
| 4,086,632 | 4/1978 | Lions | 364/444 |
| 4,153,874 | 5/1979 | Kaestner | 324/161 |
| 4,159,088 | 6/1979 | Cosley | 364/442 X |
| 4,312,041 | 1/1982 | DeJonge | 364/442 |
| 4,325,123 | 4/1982 | Graham et al. | 364/442 |
| 4,467,429 | 8/1984 | Kendig | 364/440 |
| 4,536,843 | 8/1985 | Lambregts | 364/440 |
| 4,642,775 | 2/1987 | Cline et al. | 364/444 |
| 4,760,530 | 7/1988 | Liden | 364/442 |
| 4,774,670 | 9/1988 | Palmieri | 364/446 |
| 4,812,990 | 3/1989 | Adams et al. | 364/444 |
| 4,827,417 | 5/1989 | Berger et al. | 364/442 |

OTHER PUBLICATIONS

Erzberger & Lee, "Constrained Optimum Trajectories With Specified Range," *Journal of Guidance and Control*, vol. 3, No. 1, pp. 78-85, Jan.-Feb. 1980.
Chakravarty, "4 D Fuel-Optimal Guidance in the Presence of Winds," Technical Information Service, American Institute of Aeronautics and Astronautics, No. 83-2242, pp. 584-592, 1983.
Woodburn, "Flying the Lean Machine Boeing 757," *Aerospace*, pp. 27-29, Jul.-Aug. 1984.
DeJonge and Syblon, "Applicant of Cost Index to Fleet Hub Operation," Technical Information Service, American Institute of Aeronautics and Astronautics, No. WA7-10:45, pp. 179-184 (believed to be published in 1985).
Tobias et al, "Mixing Four-Dimensional Equipped and Unequipped Aircraft in the Terminal Area," *Journal of Guidance and Control*, vol. 8, No. 3, pp. 296-303, May–Jun. 1985.
Burrows & Chakravarty, "Time-Controlled Aircraft Guidance in Uncertain Winds and Temperatures," Technical Information Service, American Institute of Aeronautics and Astronautics, No. WA7-11:45, pp. 191-197, (believed published in 1985).
Liden, "Practical Considerations in Optimal Flight Management Computations," Technical Information Service, American Institute of Aeronautics and Astronautics, No. TA1-9:30, pp. 675-681, (believed published in 1986).
Chakravarty, "Selection of an Optimal Cost Index for Airline Hub Operation," *Journal of Guidance*, vol. 8, No. 6, pp. 777-781, Nov.-Dec. 1985.

*Primary Examiner*—Thomas G. Black
*Attorney, Agent, or Firm*—Varnum, Riddering, Schmidt & Howlett

[57] ABSTRACT

A required time of arrival (RTA) control system (200, 220, 240) is disclosed for use with an aircraft on-board computer system (100). The control system (200, 220, 240) is adapted to provide data for controlling aircraft flight in a manner so as to meet time of arrival constraints at selected waypoints. The control system (200, 220, 240) includes means (212) for determining a time error between an estimated time of arrival and a designated RTA. A cost index predictor (216) is utilized to determine an estimated cost index parameter for meeting time of arrival constraints, while maintaining relative minimum fuel consumption. A flight profile predictor (202) is adapted to generate requisite target air speed data based on the estimated cost index parameter. In one embodiment, the system (240) includes determination of a time window based on maximum and minimum permissible cost index and speed limiting parameters. Dead-band control of the time error is also provided for maintaining stability and reducing throttle activity.

28 Claims, 13 Drawing Sheets

```
ACT RTA PROGRESS              2/3
RTA WPT                       RTA
EPH              1012:00Z
RTA SPD       TIME ERROR
250/.633       EARLY 01:30
SPD REST              GMT
220/HOLD         1000:30Z
DIST---- TO EPH  ----ETA
25NM             1010:30Z
FIRST--RTA WINDOW--LAST
1008:23Z         1010:30Z
<LIMITS
```

FIG. 12

REQUIRED TIME OF ARRIVAL (RTA) CONTROL SYSTEM

This is a continuation of application Ser. No. 07/504,631 filed Apr. 4, 1990 now abandoned.

BACKGROUND OF THE INVENTION

1. Field of the Invention

The invention relates to aircraft navigation and guidance systems and, more particularly, to a system for rapidly determining target speeds for meeting required times of arrival while correspondingly maintaining optimum fuel efficiency.

2. Description of Related Art

Over the past decades, the cost of petroleum fuels and the cost of labor have greatly increased, affecting many industries, including the air transportation industry. With respect to jet aircraft, the amount of fuel consumed in relatively long distance flights will be several thousands of pounds. Typically, fuel consumption can be optimized by flying aircraft at certain speeds and altitudes, subject to aircraft operation constraints, such as engine pressure ratio (EPR) limits of the aircraft engines.

Historically, booklets comprising charts having various engine pressure ratios, altitudes, speeds and the like have been compiled for use by the pilots. Prior to flight, the pilots would review the chart materials and select a particular flight profile, while maintaining aircraft performance. However, discrepancies between the real parameters of the aircraft and the theoretical parameters utilized to obtain the charts resulted in substantial errors, further resulting in excess fuel burned and excess time required in flight.

During the past two decades, numerous systems have been developed for on-board aircraft use for utilizing essentially "real time" aircraft variables for determining optimum speed/altitude flight profiles. For example, one such device is disclosed in U.S. Pat. No. 3,153,143 issued to Fogarty on Oct. 13, 1964. The Fogarty device utilizes real parameters, including weight and the change of weight as fuel is consumed, to compute the maximum range or maximum endurance. Another such device is disclosed in U.S. Pat. No. 3,613,837 issued to Brandeau on Oct. 12, 1971. The Brandeau device includes a warning indicator actuated when excessive fuel consumption is detected. Brandeau employs real data of the flight to compute fuel reserves, time to target, and the range or endurance of the flight at different altitudes.

Although fuel consumption is of primary importance with respect to economical flight, other cost factors are also of importance. For example, the crew of an aircraft can involve many people, both on the ground and in the air. The wages of such crews are often dependent on the flight time duration. Such time-dependent costs may be relatively lower at greater speeds (in view of the shorter flight durations), but fuel costs may be correspondingly increased.

A significant advance in the state of the art for flight performance systems was achieved with the performance data computer system disclosed in U.S. Pat. No. 4,312,041 issued to DeJonge on Jan. 19, 1982. The DeJonge patent discloses a flight performance data system having a control and display unit operably connected to a computer. The computer is responsive to input variables comprising real time measurements, such as air mass parameters and aircraft dynamic measurements, for automatically generating various output signals representing flight profile data.

In the system, a mode selector is operably connected to the computer in different modes to determine flight profile data for modes such as climb, cruise, and descent. For the various modes, different flight schedules can be determined corresponding to the most fuel-efficient flight, a long-range cruise flight, or the most economical flight. In part, the DeJonge patent discloses the use of a cost index factor representing a ratio of time-dependent costs for the flight, relative to flight fuel costs. The cost index factor is utilized to provide signals to the pilot representing optimum flight profile data on an economic basis.

Numerous other systems have also been developed for use in aircraft flight control. These systems include various arrangements for generating flight profile data, and also for automatically controlling the aircraft throttle and other aircraft instrumentation. These systems include the generation of output data representing estimated times of arrival (ETA's) to destinations, including not only final destinations, but also "waypoints," representing benchmark navigational coordinates of locations along a flight path.

In addition to problems associated with development of better procedures and methods for estimating and maintaining optimum flight plans within aircraft and atmospheric constraints, the airline industries have been coping with significant increases in air traffic. Historically, air traffic control (ATC) has been performed in part by local airport traffic controllers for the regions surrounding the airport. That is, as an aircraft approached the local destination airport, the local controllers would essentially "take over" control and direct the pilot to maintain certain positions and speeds during descent.

During flight between the local airport centers, air traffic control has essentially been performed by regional federal air route traffic control centers. Such control has typically involved the issuance of instructions by the federal controllers to the pilots in the form of speed, altitude, and flight path directional parameters for purposes of maintaining at least minimum spacing between aircraft. In addition to flight path control, aircraft have typically been assigned certain take-off and destination arrival times. These designated times have been coordinated through a federally-controlled computer system.

Notwithstanding the sophisticated and complex systems employed by federal and local airport authorities for directing aircraft around airports and en route to airport destinations, these systems have been "stretched" to capacity in view of current air traffic. More specifically, these systems essentially lack an overall coordination to optimize air traffic flow and aircraft performance. For example, when a local airport control area begins to reach arrival capacity, the local control authorities have had the capability of controlling traffic only within the local area. An aircraft en route to the local airport may be operating at a relatively high (and fuel inefficient) speed to meet a designated gate arrival time, only to find that the aircraft is "stacked up" and further delayed when it reaches local air space. This further delay serves to increase fuel use, in addition to adding local traffic at an airport which may already be operating above capacity. Further, stacking of aircraft clearly includes other disadvantages, such as potentially reduced safety and increased aircraft noise for local communities.

Several years ago, the Federal Aviation Administration (FAA) issued directives for purposes of establishing a "local flow traffic management program" designed to enhance airport safety, reduce impact of aircraft noise on local communities, and conserve aviation fuel. These directives specifically related to review and revision of procedures utilized by air traffic divisions and air route traffic control centers to reduce flying times at low altitudes (e.g. below 10,000 feet) and provide for maximum use of profile descents from cruising altitudes to an approach gate.

The directives issued by the FAA also established a "metering" program for purposes of developing procedures to monitor the arrival flow, so as to determine when the number of aircraft approaches system capacity. This concept, often referred to as "en route metering" (ERM), essentially allows aircraft to absorb any necessary arrival delays en route, with transition to the terminal area in a pre-planned sequence based on a calculated airport acceptance rate. When delays would be imposed, the priority of landing would be based on the calculated time of arrival (CTA) for each aircraft. These calculated times of arrival would be based on the estimated time of arrival at a meter fix, plus the estimated flying time to the runway. These times would then be adjusted to resolve simultaneous demands at the airport, and to establish a time that an arriving aircraft would be required to cross a meter fix. With these procedures, several advantages are intended. For example, a primary concept is to minimize congestion and delay in airport terminal air space, thereby reducing noise around the major airports and also reducing the exposure of high performance aircraft to low performance aircraft. In addition, it is also desirable to prevent unnecessary delay of arrival flights, by removing or reducing current flow restrictions. Still further, it is a primary advantage to essentially move the unavoidable delay outside of the termination air space. In this manner, aircraft delays would be essentially more fuel efficient, since the delays would occur during high altitude flight. In addition, for relatively short range flights, delay can occur while the aircraft is maintained on the ground prior to take-off. In general, a primary objective of en route metering is to organize arrival traffic in en route air space, by providing interfacility coordination of arrival delays and also by assisting in the merging of arrival flights.

Early operational experience with the FAA directives essentially indicated that the principles associated with the directive and the requisite procedures would be effective. However, metering functions previously had to be accomplished manually, requiring a significant amount of resources in preparing metering strips, computing times and requisite updates. Accordingly, subsequent governmental directives were issued for providing guidance and procedures for the development, implementation and operational utilization of an automated ERM program. During the early part of the 1980's, ERM procedures were in place at a number of major airports.

In further explanation of the ERM concept, the primary objective is to allow aircraft to absorb arrival delays, based upon current "airport acceptance rates", during the en route phase of flight under substantially more fuel-efficient conditions. Further, the aircraft would then be "fed" into the airport in a pre-planned, orderly sequence. This type of arrival sequence is essentially a first come-first served sequence, and is based upon projected airport arrival times.

The ERM function is essentially dependent upon the local adaptation of several input meter parameters, and provides meter-related messages for use by control personnel in the metering process. The metering process is essentially a method of time regulating, where necessary, arrival traffic flow into a terminal area without exceeding the airport acceptance rate, and by allowing arrival delays to be absorbed at higher altitudes en route. To efficiently and accurately apply this concept, arrival traffic must be consistently routed into a terminal area via designated metering routes (standardized flight paths) primarily consisting of an outer fix, meter fix, and a predetermined route to an active runway (vertex).

With ERM procedures, each metered arrival is assigned a meter fix time based on the airport acceptance rate and the aircraft's CTA at the vertex. Conflicts between two or more aircraft determined to reach the vertex at approximately equal times are accounted for when runway times are actually assigned. By establishing a priority sequence for arrivals, based upon their scheduled landing times, and computing their meter fix times accordingly, "first come-first served" is effectively achieved with the distribution of arrival delays in an "equitable" manner among all metered aircraft.

As part of the en route arrival metering strategy, a primary concept is to predict the time each aircraft will arrive at the runway, if no control is exercised. With the previously-established metering procedures, this strategy is accomplished dynamically, while the aircraft are typically at en route altitudes and in a range, for example, of 150 to 175 nautical miles away from the runway. Based on this initial arrival time estimate, a desired runway (or airport) schedule is created which provides for interoperation times consistent with airport capacity, and which resolve conflicting runway use. Accordingly, a desired time slot is created for each aircraft, perhaps 30 minutes prior to when the actual operation is to occur. This "list" of assigned runway times is then adjusted by the transition times from meter fixes to the runway, so as to achieve an assigned time at a meter fix. This assigned meter fix time is utilized by the en route sector controller to "deliver" each aircraft to the traffic controller. The traffic controller will utilize speed control and/or vectoring so as to achieve delivery within an accuracy of ±one minute. Adequate separation must be maintained between the aircraft at all times. In addition, with flow rate essentially being the primary parameter for the metering strategy, a controller may actually interchange or "swap" times assigned to two aircraft en route.

Air route traffic control centers have instituted control positions characterized as the arrival sequence controllers. These positions are involved in the sequencing and scheduling of airplanes, rather than the actual control which is eventually accomplished by the sector controller providing the meter fix. The arrival sequence controller essentially operates with computer-generated "flight strips" indicating aircraft identification, type, arrival meter fix and estimated arrival time at the meter fix. In an original implementation, the estimated meter fix time was generated by projecting the airplane from its current position to a meter fix based on flight plan speed. A nominal transition time value was then added to the meter fix estimate, so as to obtain the estimated landing time. The TMA transition times were typically based on a table of values, giving the time as a function of the particular meter fix and aircraft-type category. Also, meter fix time estimate corrections could be provided to the arrival sequence controller by the system, based on various changing parameters.

Various software packages have been developed for providing geometry/procedures/traffic data specific to given terminal areas. Approach times are calculated based on the specification of a sequence of approach "legs." Such an approach leg is described in terms of path distance, heading, altitude and true air speed (which may also depend on aircraft type). Impact of wind on flight leg transition times can also be factored into the calculations. In this manner, each arrival is essentially assigned a "nominal" approach path, comprising a sequence of approach legs for computing the estimated TMA transition time.

With this data, the arrival sequence controller reviews the list of landing times so as to determine, for example, whether the airport capacity will be exceeded for any ten minute period. If so, the sequence controller will also determine if any landing conflicts may occur. If a ten minute demand will be exceeded, the controller can progress from "passive metering" to "active metering." The metering program will determine successive capacity time slots for each aircraft, based on the sequence established by the initial landing time estimate. These assigned landing times are then re-adjusted for nominal TMA transition times, so as to obtain an assigned time at the meter fix. This assigned meter fix time can then be displayed to the appropriate sector controller, with the sector controller then controlling the aircraft so as to maintain the assigned times. With this arrangement, only aircraft for which a landing time exists will be allowed into the "near-terminal" region. In addition, this process also essentially equitably distributes air traffic control delay, and provides visibility as to when and how much holding may be required in an en route area. The automation procedures essentially provide various algorithms so as to perform runway time calculation, runway scheduling and meter fix time assignment functions, with the results displayed at the arrival sequence controller position, and with results displayed to the appropriate sector controllers when active metering is in progress.

For purposes of achieving a nationwide en route metering strategy, it is advantageous for aircraft to have the capability of dynamically adjusting speed and/or flight paths in response to a designated metering fix, for purposes of crossing the meter fix at the designated time (within certain precision tolerances). This procedure is often characterized as time controlled navigation (TNAV) and guidance. Time-controlled navigation and guidance is the ability to specify a desired crossing time at a selected waypoint, and provide control signals to enable an aircraft to meet a crossing time objective. As previously described, aircraft controllers can utilize specified crossing times in en route metering, along with radar monitoring, so as to establish orderly traffic separation for aircraft arriving into a limited capacity local control area. This concept of utilizing commands in a time-controlled navigation system is also characterized as "4-D control."

4-D control can be achieved by various procedures. For example, the aircraft can execute holding patterns, or other path stretching maneuvers, when required to delay the arrival time. Also, aircraft speed adjustments can be made as required. Commands for providing this dynamic adjustment of aircraft speed and/or flight paths can be received by the aircraft from different sources. For example, commands related to speed and flight paths can be directly received from air traffic control computer systems. Also, such specific commands can be received directly from controllers. Still further, and of primary importance, it is now known to utilize on-board aircraft computer systems for purposes of providing command signals to the aircraft and for generating flight profile data based on various parameters. In particular, such on-board computer systems have been utilized for generating relatively more fuel efficient flight profiles, thereby reducing fuel consumption and providing cost savings. These known on-board systems include the capabilities for performance of strategic and tactical flight planning, providing aircraft performance calculations, displaying relatively precise navigation and guidance data, and further providing the capability of direct interfacing with airline and air traffic control data-links. The basis for many of the known on-board computer systems is the capability of providing, in real time, optimum speed commands and altitude data. Since these on-board computer systems, often referred to as flight management systems (FMS) or flight management computer systems (FMCS) receive real time data from sensor inputs, typically include data bases comprising aircraft performance characteristics, and navigation facility and routing information and have the capability of being coupled to autopilots/autothrottles, such systems are particularly advantageous for performance of 4-D control.

The principal elements of a time-controlled navigation or 4-D control capability include the following: (1) a performance definition section, generating a four-dimensional reference path based on airplane performance and navigation data; (2) a navigation section, in which sensor data are used to calculate a current aircraft state vector (i.e. location, direction and velocity); (3) the guidance section, in which the current state vector is compared to a reference path and differences (error signals) determined in a form suitable for driving the flight control system; and (4) a flight control system which commands the aircraft aerodynamic controls and engine thrust, as necessary, to respond to guidance signals and actually "fly" the desired 4-D control path. A time-controlled navigation procedure can provide substantial benefits over basic methods of control, in view of increased precision for meter fix arrival times, relatively more fuel-efficient flight, reduced pilot workload, and reduced controller workload.

Until recently, use of time-controlled navigation and specifications of desired crossing times have been limited to utilization within traffic control centers, since aircraft systems have not had the capability of making substantial use of this data. To provide for optimum use of desired crossing time information, the following elements are required within aircraft systems: (1) accurate lateral and vertical navigation, with waypoint naming conventions consistent with air traffic control procedures; (2) the ability to accurately predict earliest and latest arrival times at a designated waypoint within an aircraft's performance envelope, in order to provide an indication as to the capability of compliance with an air traffic control request; (3) active speed control within an aircraft's performance envelope, for purposes of meeting the time objective; (4) an indication alert when an aircraft can no longer meet a time objective within a given tolerance; and (5) guidance for lateral delay absorption maneuvers, for purposes of meeting the time objective.

Currently, flight management computer systems are available which have the capability of accurately predicting flight profiles, while correspondingly taking into account lateral and vertical flight plans, aircraft limits, and predicted atmospheric conditions. For purposes of providing time-controlled navigation, the capability of predicting crossing times with relatively high accuracy is of primary importance. In known flight management computer systems, this accuracy is dependent in part on the accuracy of predicted wind conditions.

As previously described, a parameter of primary importance in aircraft flight management computer systems is the cost associated with the flight. As will be described in subsequent paragraphs herein, this parameter is typically referred to as a "cost index" (CI), utilized to describe relative costs between flight time and fuel consumption. An advantageous feature of utilizing the cost index for time-controlled navigation is that the cost index affects climb, cruise and descent profiles in a manner so that profiles can be computed which result in minimum fuel consumption for the corresponding flight times.

In view of the foregoing, assuming that the aircraft is provided with waypoints and required times of arrival by the air traffic controller (or otherwise), it would appear ideal to enter the waypoint and RTA data into the flight management computer system and then await generation of new flight profile data. In general, the flight management computer system would be programmed to essentially "search" for the optimum cost index, while still meeting the time constraints of the designated required times of arrival. However, with on-board processors currently implementing flight management computer systems, flight profile prediction computations may require a substantial period of time to complete. Correspondingly, with search techniques such as a conventional binary search algorithm for purposes of searching for the cost index required to meet a particular time constraint, a number of trial "passes" at flight profile predictions would be required. If the system is being utilized for purposes of achieving active control of the aircraft, such long computation and search times are essentially unacceptable.

SUMMARY OF THE INVENTION

In accordance with the invention, a required time of arrival control system is provided for rapidly determining adjustments in air speed required to meet a desired crossing time at a selected waypoint. The required time of arrival control system is adapted for use in an aircraft having flight management processing means responsive to input data signals representative of a flight plan, aircraft limits and predicted atmospheric conditions, and further responsive to a cost index parameter indicative of a cost relationship between flight time and fuel consumption for the aircraft. The flight management processing means is adapted to generate predicted flight profile data, including target aircraft speeds and estimated times of arrival.

The required time of arrival control system includes input means for receiving data signals representative of a required time of arrival (RTA) corresponding to the desired crossing time at the selected waypoint. Cost index processing means are provided which are responsive to data signals representative of the RTA for determining an estimated cost index parameter which will provide a flight time substantially corresponding to the RTA. The cost index processing means makes the determination based on an assumption that the distance travelled between a current position and the selected waypoint is substantially independent of the cost index parameter. Means are provided which are responsive to the data signals representative of the estimated cost index parameter for generating data signals representative of a target air speed required to meet the flight time substantially corresponding to the RTA.

The required time of arrival control system also includes processing means responsive to data signals representative of a minimum permissible cost index parameter and navigational coordinates of the selected waypoint for generating data signals representative of a latest time of arrival at the waypoint. Additional processing means are responsive to data signals representative of a maximum permissible cost index parameter and the navigational coordinates of the waypoint for generating data signals representative of an earliest time of arrival at the waypoint. The cost index processing means is further responsive to the data signals representative of the minimum and maximum cost index parameter so as to determine the estimated cost index parameter only within boundaries formed by the minimum and maximum cost index parameters.

The required time of arrival control system further includes means for comparing data signals representative of the RTA with data signals representative of the earliest estimated time of arrival and the latest estimated time of arrival. Additional means inhibit operation of the cost index processing means in the event that the RTA is outside of boundaries formed by the earliest and latest estimated times of arrival.

In accordance with another aspect of the invention, the system includes display means for displaying, to an aircraft pilot, data representative of the RTA falling within or outside of the boundaries formed by the earliest and latest estimated times of arrival. Further, the system includes input means for receiving data signals representative of an allowable time tolerance for the estimated time of arrival.

The cost index processing means includes a database comprising data representative of remaining flight time and fuel consumption for the aircraft as a function of the cost index parameter. Means are provided for performing a binary search from a current value of the cost index parameter to maximum and minimum permissible values of the cost index parameters for purposes of determining the estimated cost index parameter which will provide a flight time substantially corresponding to the RTA.

The cost index processing means includes comparison means for comparing data signals representative of the RTA with data signals representative of an estimated time of arrival corresponding to a cost index parameter substantially equal to a midpoint between the maximum and minimum permissible values of the cost index parameter. Further means are provided for determining the sign of the difference between the estimated time of arrival corresponding to the midpoint cost index and the RTA. Additional means are provided for resetting the minimum permissible cost index parameter or maximum permissible cost index parameter to the midpoint cost index parameter, dependent upon the sign of the difference. This means is also adapted for repeating the comparison of the estimated time of arrival corresponding to a new midpoint cost index parameter located at the new midpoint formed in part by the reset minimum cost index parameter or maximum cost index parameter. The resetting process is repeated until the estimated time of arrival of a midpoint cost index parameter is substantially within a predetermined value of the RTA.

In accordance with another aspect of the invention, the required time of arrival control system includes means responsive to data signals representative of the RTA and data signals representative of the estimated time of arrival for generating data signals representative of a time error substantially equal to the difference between the RTA and the estimated time of arrival. Dead-band means are responsive to the data signals representative of the time error for generating a dead-band signal indicative of whether the time error falls within or outside of a predetermined dead-band time width. Additional means are provided which are responsive to the dead-band signal for inhibiting operation of the cost index processing means when the dead-band signal is indicative of the time error falling within the predetermined dead-band time width.

The dead-band means is further responsive to data signals representative of the remaining flight time from a current time to the RTA, and the dead-band signal is a function of both the time error and the remaining flight time, with the predetermined time width being a function of the remaining flight time. The required time of arrival control system also includes input means for receiving data signals representative of an allowable time tolerance for the estimated time of arrival. The dead-band means is further responsive to the data signals representative of the allowable time tolerance, the dead-band signal is, in part, a function of the allowable time tolerance.

The predetermined time width can be a constant value when the remaining flight time is less than a value which is a function of the allowable time tolerance, but greater than a predetermined fixed time. The control system also includes means for adjusting the RTA when the remaining flight time is less than the value which is a function of the allowable time tolerance, but greater than a predetermined fixed time.

The control system also includes means responsive to the data signals representative of the remaining flight time for inhibiting operation of the cost index processing means when the remaining flight time is less than a predetermined fixed time. Further, the predetermined dead-band time width can be a constant value when the remaining flight time is greater than a predetermined value.

In accordance with a further aspect of the invention, the flight plan can be divided into a plurality of segments, including climb, cruise and descent segments. The required time of arrival control system can include means for determining a current average ground speed for each of the segments, corresponding to the current cost index parameter. Means are also provided for determining an estimated average ground speed for each of the segments corresponding to the estimated cost index parameter. Additional means are provided for generating data signals representative of an estimated remaining time of flight for each of the segments, corresponding to a ratio of the current average ground speed to the estimated average ground speed for each corresponding segment, multiplied by a predicted remaining time of flight for each of the corresponding segments, using the current cost index parameter. Further, means are provided for summing the data signals representative of the estimated remaining times of flight for each of the segments, and for generating data signals corresponding to a total remaining time of flight corresponding to the estimated cost index parameter.

The average ground speed for the climb and descent segments is determined as an average of beginning and ending ground speeds for each of the climb and descent segments. When the cruise segment is greater than a predetermined distance, the cruise segment is divided into a plurality of segments of relatively shorter distance for purposes of computing average ground speeds of the shorter distance segments.

The required time of arrival control system also includes means for generating data signals representative of an average wind component. The cost index processing means is further responsive to the data signals representative of the average wind component for determining the estimated cost index parameter.

In accordance with another aspect of the invention, the invention includes a method for rapidly determining adjustments in air speed required to meet a desired crossing time at a selected waypoint. The method is adapted for use in an aircraft having flight management processing means responsive to input data signals representative cf a flight plan, aircraft limits and predicted atmospheric conditions, and further responsive to a cost index parameter indicative of a cost relationship between flight time and fuel consumption for the aircraft. The flight management processing means is adapted to generate predicted flight profile data, including target aircraft speeds and estimated times of arrival.

The method includes receiving data signals representative of a required time of arrival corresponding to the desired crossing time at the selected waypoint. An estimated cost index parameter is determined which will provide a flight time substantially corresponding to the RTA. The determination is based on an assumption that the distance travelled between a current position and the selected waypoint is substantially independent of the cost index parameter. Data signals are generated which are representative of a target air speed required to meet the flight times substantially corresponding to the RTA, in response to data signals representative of the estimated cost index parameter.

Data signals are also generated which are representative of a minimum permissible cost index parameter and navigational coordinates of the waypoint. Additional data signals are generated which are representative of a latest time of arrival at the waypoint, based on the data signals representative of the minimum permissible cost index parameter and the navigational coordinates of the waypoint. Additional data signals are generated which are representative of a maximum permissible cost index parameter. Still further data signals are generated which are representative of an earliest time of arrival and the selected waypoint, based on the data signals representative of a maximum permissible cost index parameter and the navigational coordinates of the waypoint.

The method also includes the determination of the estimated cost index parameter only within boundaries formed by the minimum and maximum cost index parameters. Data signals representative of the RTA are compared with data signals representative of the earliest estimated time of arrival and the latest estimated time of arrival. Additional determinations of estimated cost index parameters are inhibited in the event that the RTA is outside of boundaries formed by the earliest and latest estimated times of arrival.

BRIEF DESCRIPTION OF THE DRAWINGS

The invention will now be described with respect to the drawings in which:

FIG. 12 illustrates a typical page display which may be generated by the RTA control system in accordance with the invention.

DESCRIPTION OF THE PREFERRED EMBODIMENTS

Figure 1:
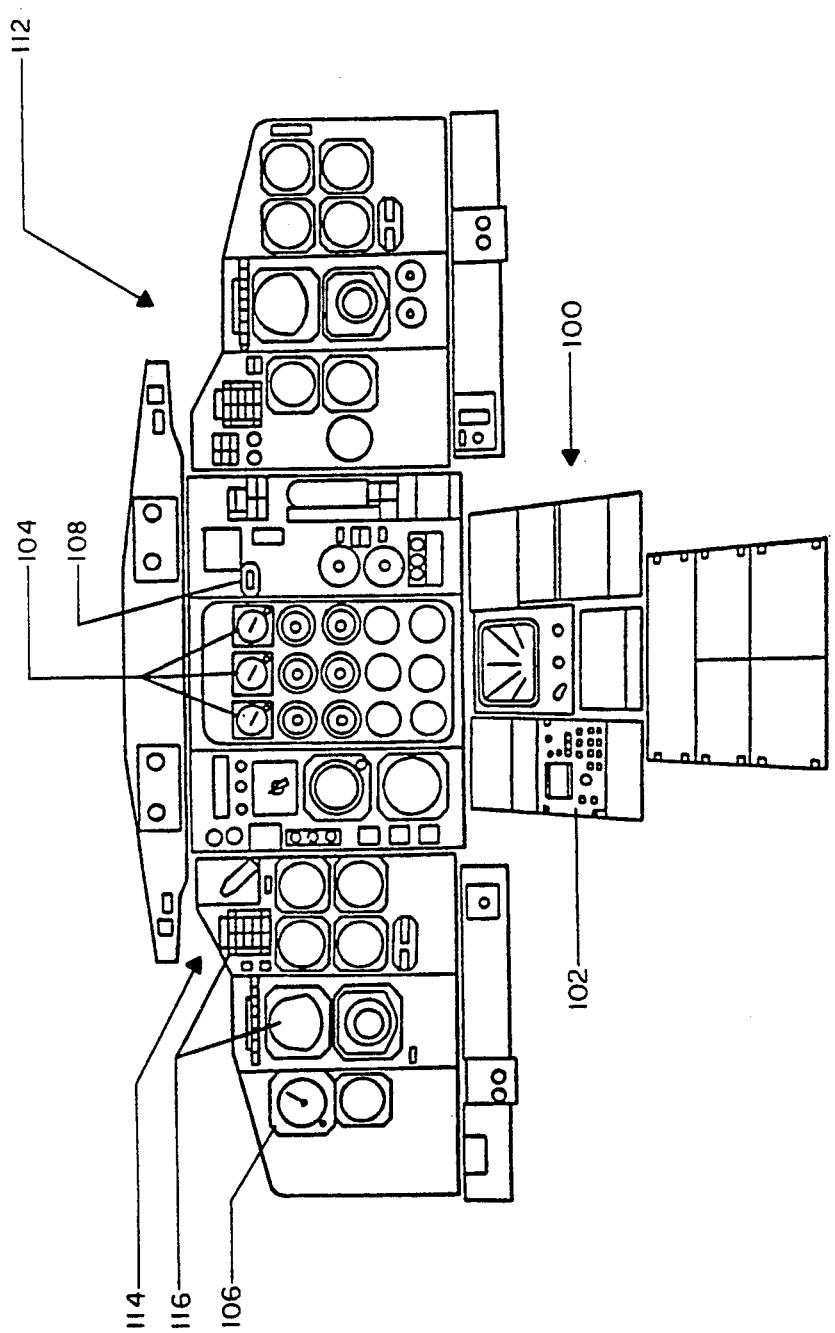
FIG. 1 is a prior art view of a pilot's cockpit, equipped with an on-board computer system which can be utilized in accordance with the invention.
Figure 2:
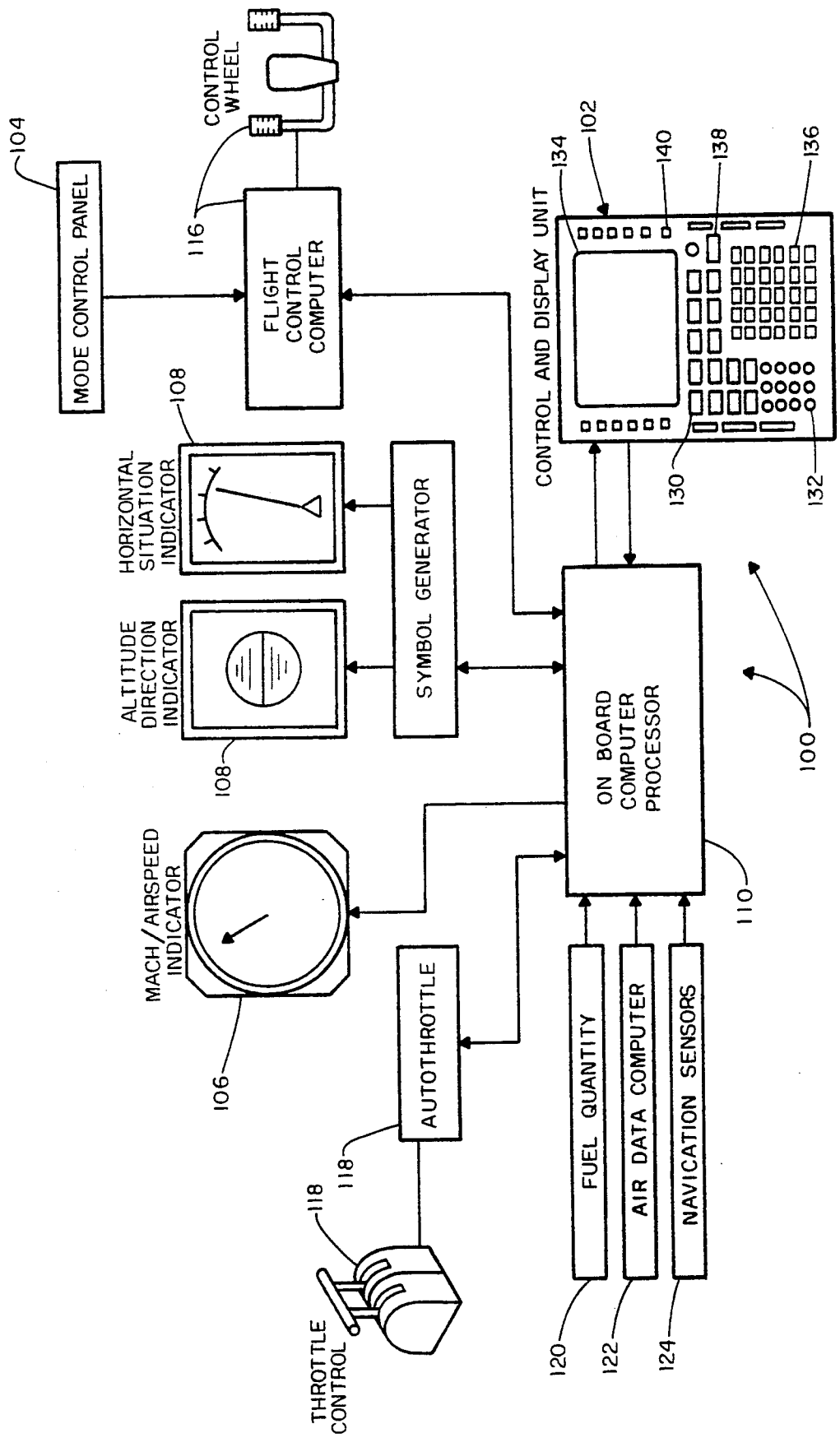
FIG. 2 is a partial block diagram of an embodiment of the on-board computer system illustrated in FIG. 1.
Figure 6:
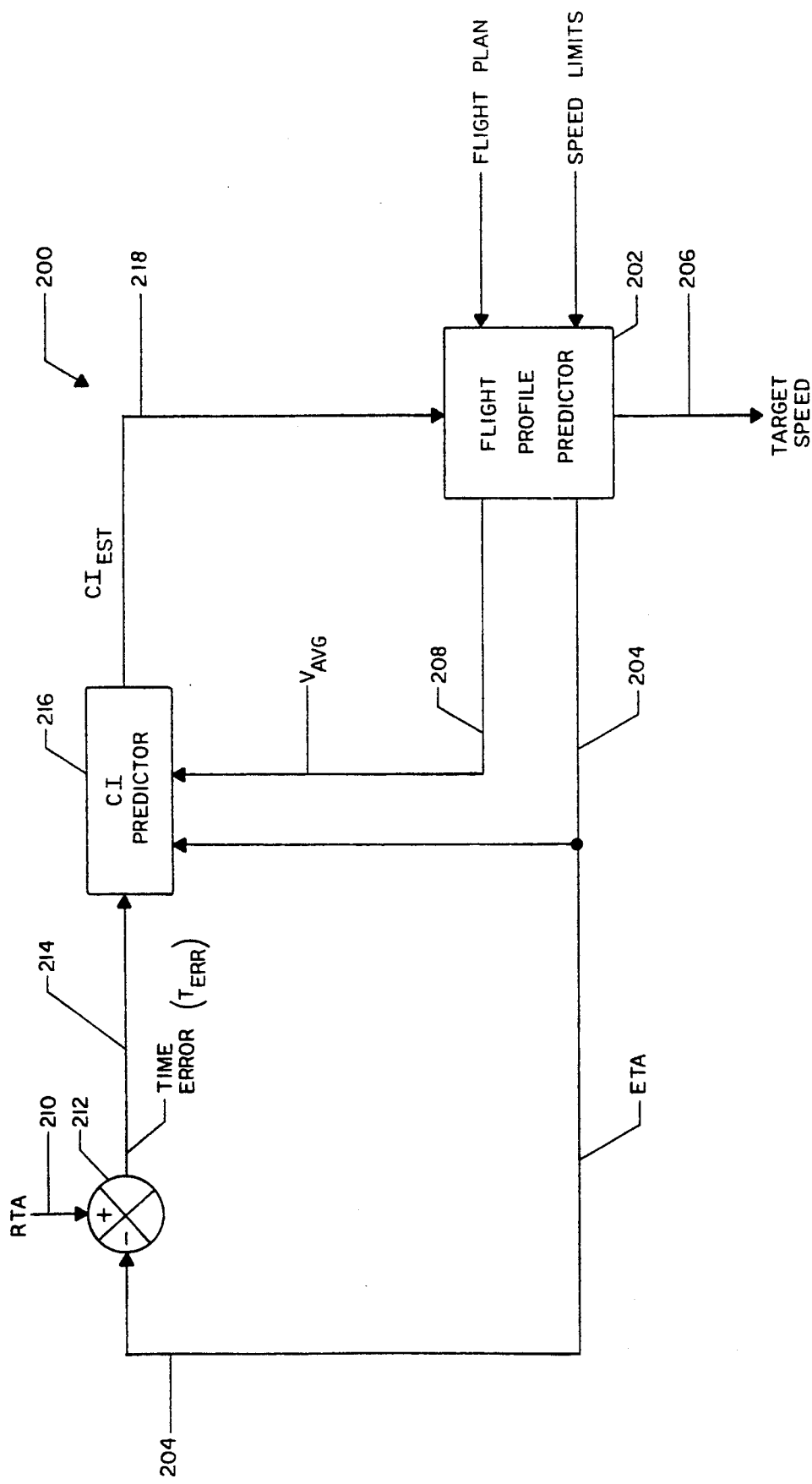
FIG. 6 is a block diagram of an embodiment of a required time of arrival (RTA) control system in accordance with the invention, and which can be implemented within the on-board computer system illustrated in FIGS. 1 and 2.
Figure 7:
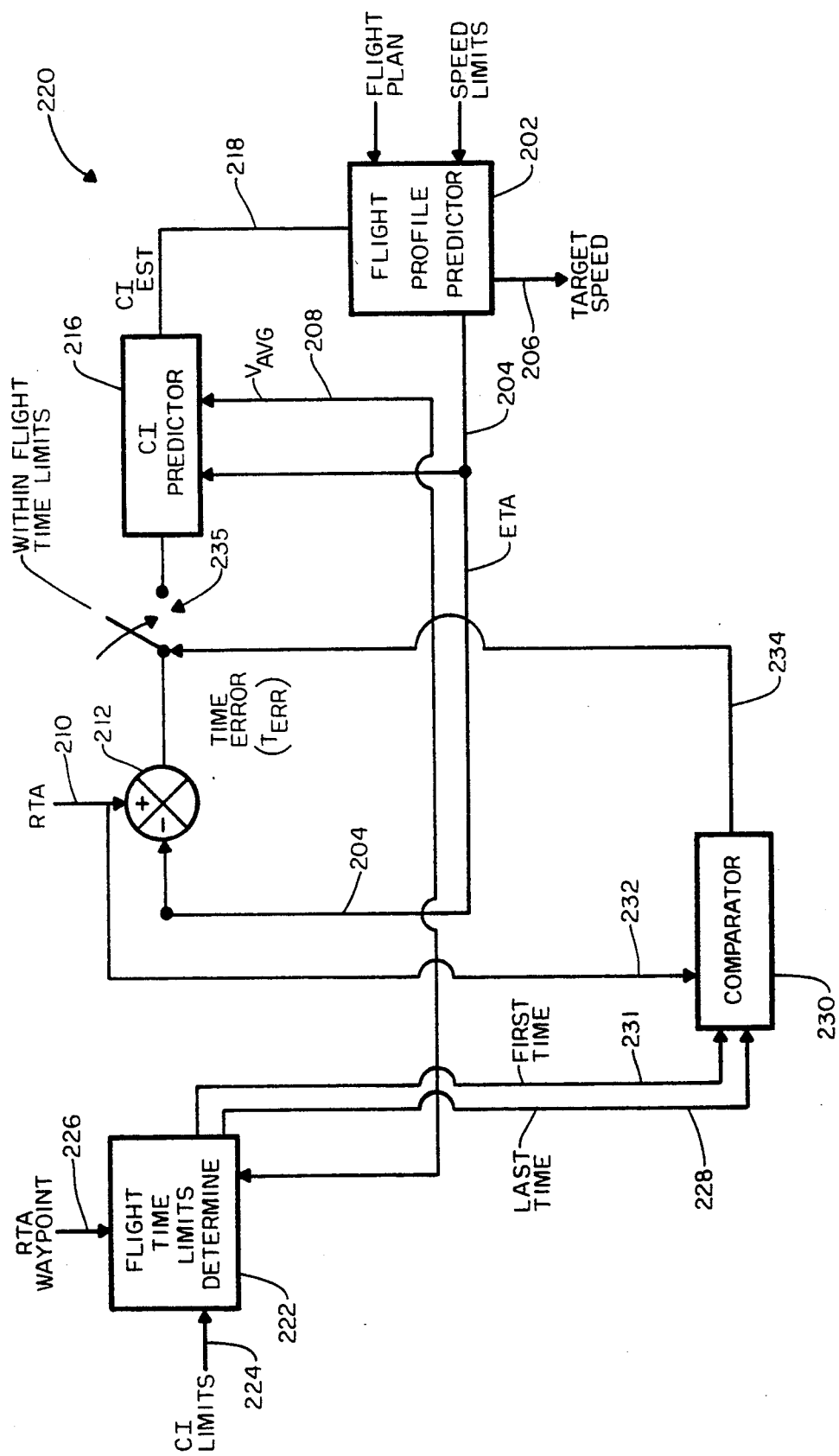
FIG. 7 is a block diagram of a further embodiment of an RTA control system in accordance with the invention, showing the use of a determination of flight time limits.
Figure 8:
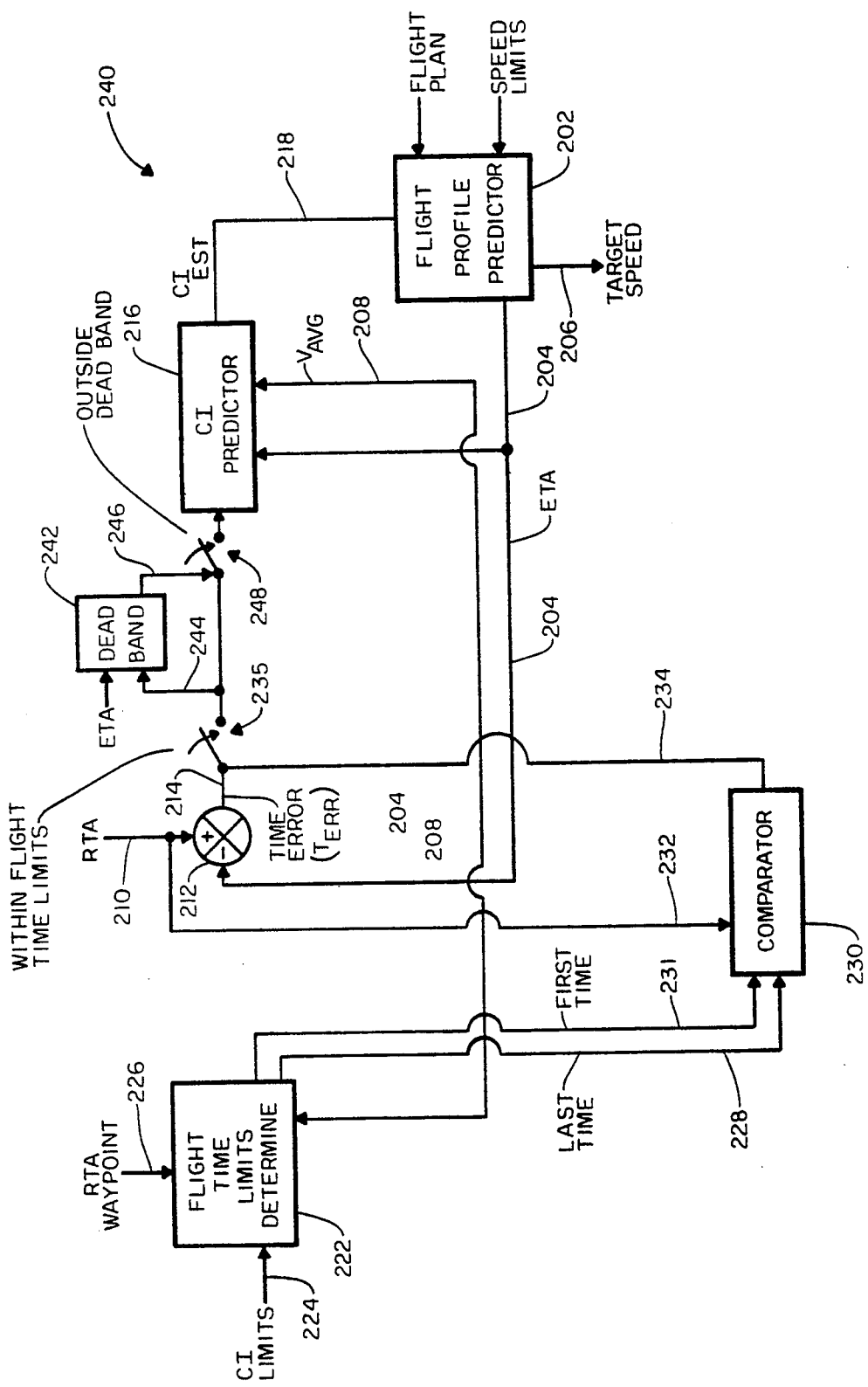
FIG. 8 is a block diagram of a still further embodiment of an RTA control system in accordance with the invention, showing the use of a dead-band arrangement.

The principles of the invention are disclosed, by way of example, within a required time of arrival (RTA) control system primarily illustrated in FIGS. 6, 7 and 8, and which may be implemented within an aircraft on-board computer system 100 as primarily illustrated in FIGS. 1 and 2. As described in greater detail herein, the RTA control system is adapted to provide data (or actual control) for controlling aircraft flight in a manner so as to meet time of arrival constraints at any specified spacial locations or "waypoints." As further described herein, the RTA control system utilizes a particular control procedure employing a "cost index" prediction function, for purposes of generating control data appropriate to minimize fuel consumption while achieving the time of arrival constraints. With this control procedure, relatively rapid operator response and accurate closed-loop control response is provided, without necessitating the use of an extremely fast and, correspondingly, expensive on-board processor.

The RTA control system, in accordance with the invention, can be implemented within the on-board computer system illustrated primarily in FIGS. 1 and 2. However, it should be emphasized that the on-board computer system 100 illustrated in FIGS. 1 and 2 is merely an exemplary embodiment of one type of computer system which can be utilized with an RTA control system in accordance with the invention. Numerous other types of on-board computer systems can be utilized with the RTA control system in accordance with the invention. More specifically, the RTA control system in accordance with the invention can essentially be implemented with any type of flight management system having the capability of generating relatively accurate flight profile predictions, while taking into account such parameters as lateral and vertical flight plans, aircraft limits and various predicted atmospheric conditions.

Turning to the on-board computer system 100 illustrated in FIGS. 1 and 2, the system 100 includes a control and display unit 102, mode control panel 104, Mach/error speed indicator 106, and electronic flight display system 108 operably connected to an on-board processor 110. FIG. 1 specifically illustrates the on-board computer system 100 embodied within the structure of a conventional cockpit 112. The cockpit 112 includes a control panel 114 having various instrumentation.

As primarily illustrated in FIG. 2, the computer processor 110 is interconnected to various input sensors 118. The sensors can include, for example, a fuel quantity sensor 120, an error data computer 122, and navigation sensors 124. The air data computer 122 provides signals representing altitude pressure, air speed and total air temperature. The navigation sensors 124 provide signals representing intertial position, ground speed and a position relative to radio navigation facilities. The processor 110 is adapted to receive other input signals applied from the control and display unit 102, and provides outputs to the electronic flight display system 108, the air speed indicator 106, the flight control system 116 and the autothrottle 118. The sensors 120-124 are typically located at conventional locations about the aircraft, so as to most accurately determine the desired parameters.

Figure 3:
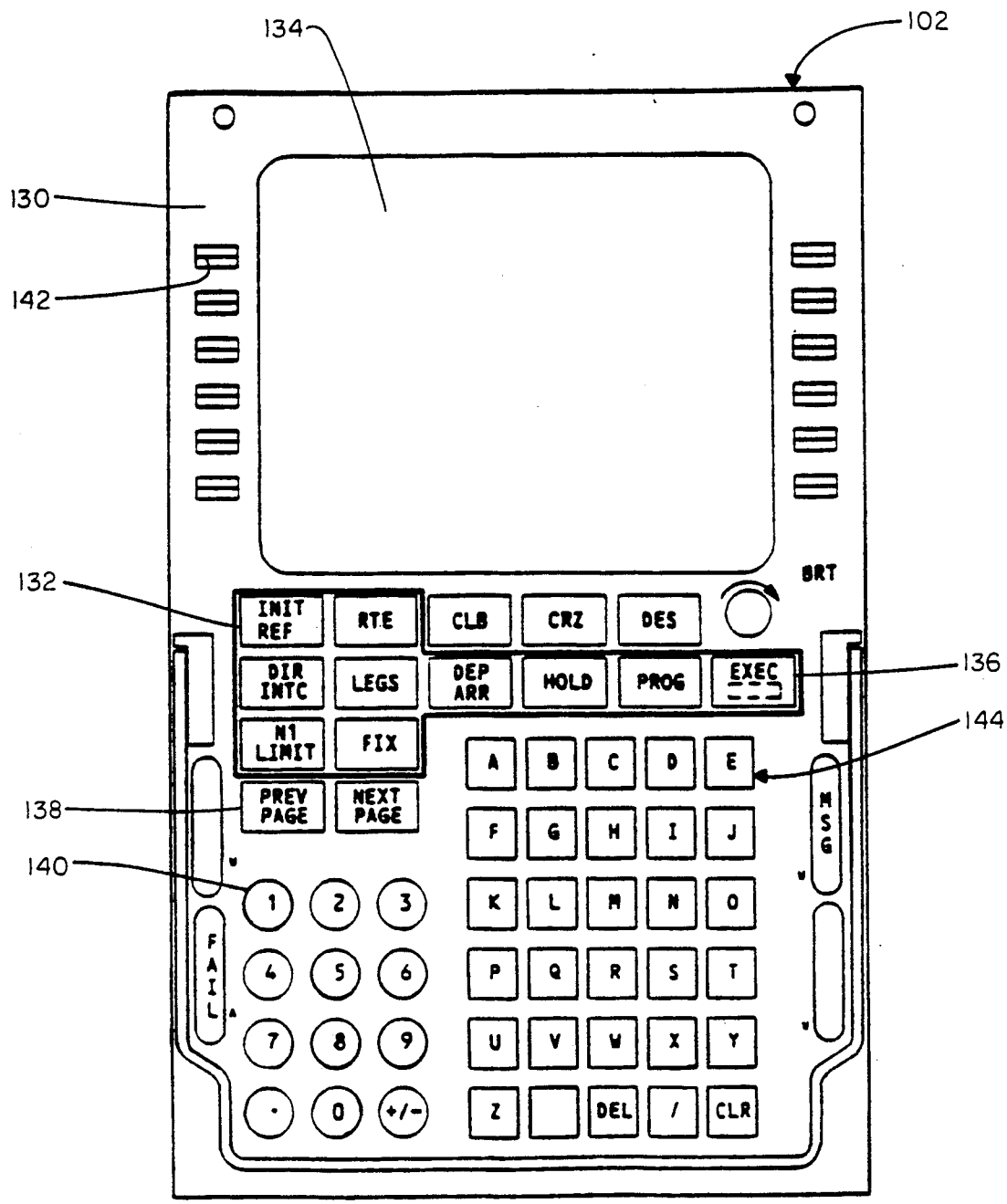
FIG. 3 is an enlarged view of the control and display unit shown in FIG. 2.

As illustrated in FIG. 3, the control and display unit 102 can be housed in a casing 130 having mode function keys 132, display panel 134, execute 136, page select keys 138, numeric keys 140, line select keys 142, and keyboard 144 comprising a plurality of keys. The processor 110 is adapted to generate and apply output signals to the display panel 134. Other buttons and keys as previously described provide various input signals to the processor 110.

In general, the on-board computer system 100 provides a means for receiving various input data and generating flight profile data utilizing real time parameters. Details of the structure and functional operation of the on-board computer system 100, relating to flight profile data, are specifically described in U.S. Pat. No. 4,312,041 issued to DeJonge on Jan. 19, 1982. The DeJonge patent is expressly incorporated by reference herein. As explained in the DeJonge patent, one parameter utilized as input data to the system 100 is typically characterized as a cost index. This index is typically a number representative of time-dependent costs (such as wages and overhead costs) of being airborne, relative to costs of fuel. Such cost indices may be relatively unique for each flight, and may also be changeable when wages or the cost of fuel change.

Figure 4:
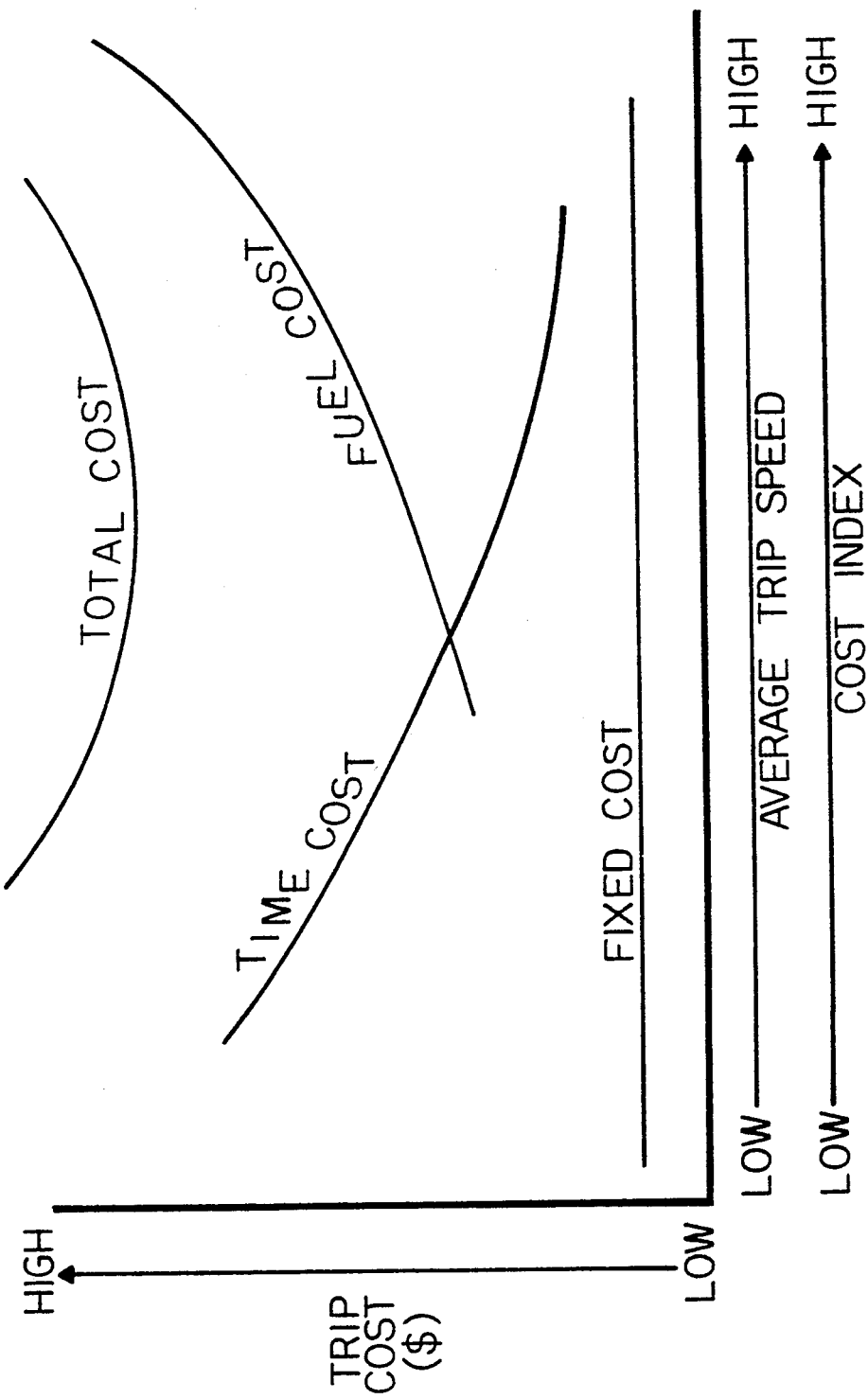
FIG. 4 is an illustration showing the relationship of trip costs to average trip speed for a typical aircraft.

In further explanation of the concept of the cost index, a fundamental value of any on-board aircraft computer system is the capability to provide, in real time, optimum speed commands and altitude data. The cost index can be utilized to essentially control, in part, the optimized profile. To explain the details of the cost index, FIG. 4 represents the relationship between trip cost and average trip speed for a given flight of a specific aircraft. The criteria for establishing a minimum direct operating cost (DOC) trajectory can be stated in terms of a cost function comprising each of the DOC cost elements, i.e. time and fuel. The total cost of the flight during, for example, the cruise phase (expressed in dollars per nautical mile) can be shown as:

$$\text{Total Cost} = C_t/V_g + 0.01 \ C_f W_f/V_g \quad \text{(Equation 1)}$$

where $C_t$ represents the time cost in dollars per hour, $C_f$ represents the fuel costs in cents per pound, $W_f$ represents the fuel flow in pounds per hour, and $V_g$ represents the ground speed in nautical miles per hour. With the foregoing representing total costs of a flight during a particular mode, such as the cruise mode, the "cost index" (CI) can be utilized to express the balance between fuel and time costs as a ratio, in accordance with the following:

$$\text{Cost Index} = CI = C_t/C_f \quad \text{(Equation 2)}$$

With known flight management computer systems, the cost index can be utilized during climb and descent modes, as well as during cruise modes. For calculations of cost indices in typical flight management computer systems, fuel costs can usually be obtained in a relatively simple manner. However, time cost relationships are somewhat more complex. Typically, time-related costs are separated into costs which are directly related to flying time, and costs which are essentially "fixed" for the flight. In most flight management systems, only those costs which are trip dependent are utilized in determining the cost index.

With the quantification of the actual costs of additional flying time, the cost index can be utilized to properly minimize direct operating costs. It can be noted that, for a given trip distance and atmospheric conditions, fuel consumption and total trip time are inversely related. That is, faster trip times utilize additional fuel. The values placed on time costs utilized to calculate a cost index have a direct effect on trip time, which is typically determined by an optimization routine which essentially "trades off" fuel consumption versus trip time, until a minimum direct operating cost is achieved. Additional details relating to the use of cost indices are described in various references, including DeJonge and Syblon, *Application of Cost Index to Fleet Hub Operation*, pp. 179-184, American Institute of Aeronautics and Astronautics, WA7-10:45.

Figure 5:
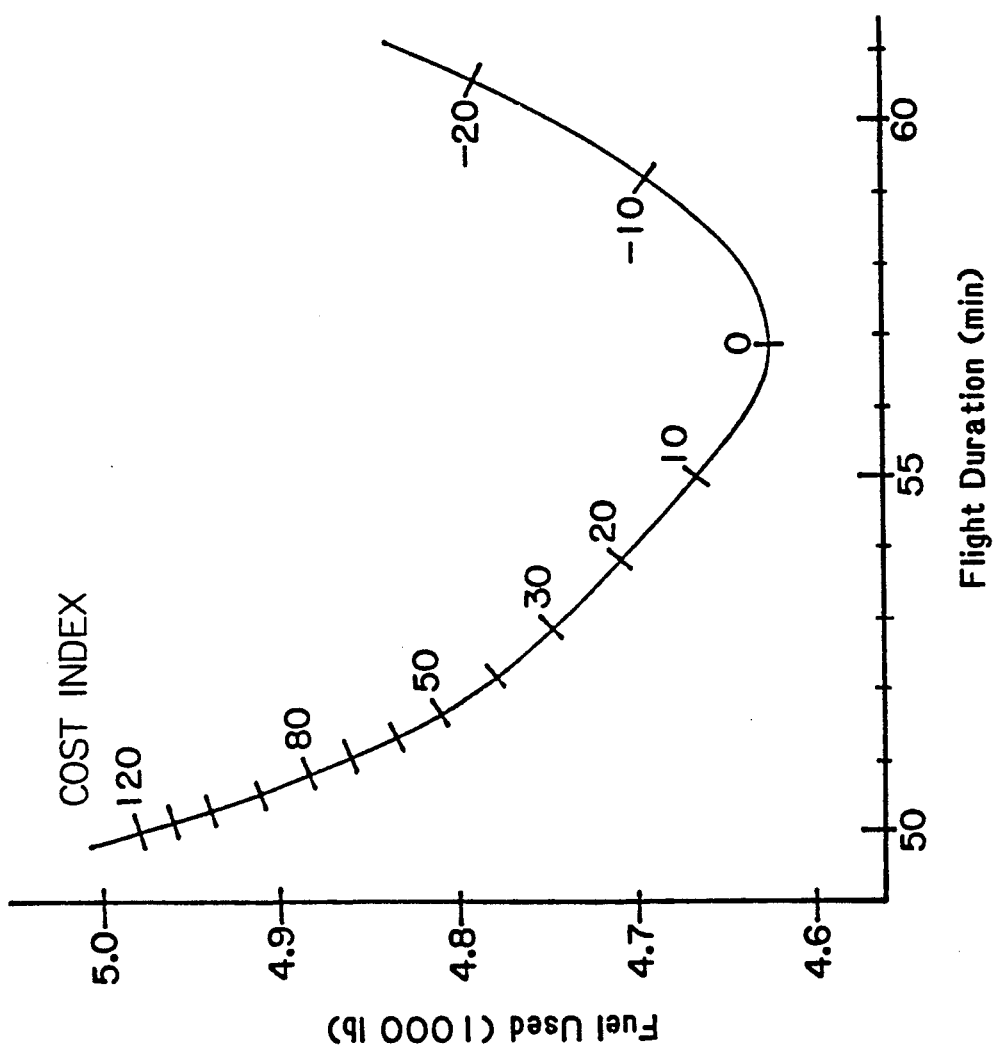
FIG. 5 is an illustration of a typical relationship among variables associated with fuel consumption, flight duration and the cost index.

In accordance with the foregoing, it is apparent that a required entry parameter utilized for optimizing trip costs in a flight management computer system is the cost index. FIG. 5 illustrates a typical relationship between fight time and fuel consumption as a function of the cost index. It is apparent from FIG. 5 that the cost index has a direct relationship with respect to flight time, a relationship which is expected since a fundamental control parameter is the aircraft speed schedule. It should also be noted that the lowest point on the fuel consumption curve shown in FIG. 5 is characterized as corresponding to a zero cost index. In addition, as also apparent from FIG. 5, a negative cost index can be achieved. Such a negative cost index would exist in situations where, in order to arrive at a designated location in a time which is greater than the time required to arrive at the location utilizing minimum fuel, additional fuel must actually be utilized.

As previously described in the section entitled "Background of the Related Art" and elsewhere herein, time-controlled navigation and guidance is the ability to specify desired crossing time at a selected waypoint, and provide control signals to enable the aircraft to meet the crossing time objective. In particular, air traffic controllers can utilize specified crossing times and en route metering, along with radar monitoring, to establish orderly aircraft separation, with respect to aircraft arriving into a limited capacity local control area. Previously, use of desired crossing times has been limited to within the local traffic control centers, since the aircraft systems have not had the capability to make use of such data. However, with the advent of flight management computer systems, such as the on-board computer system 100 previously described herein, flight profile predictions can be generated. The predictions can be utilized to provide target aircraft speeds to meet required times of arrival (RTA's) utilized for traffic control. In particular, target speeds can be generated which also take into account the optimization of trip costs on the basis of cost indices. However, as further previously described, flight profile prediction computations can require a substantial period of time. In addition, even after flight profile predictions have been completed, conventional search algorithms for attempting to find the cost index required to meet particular time constraints may require numerous "passes" at profile predictions. Accordingly, a number of profile predictions may be required.

In accordance with the invention, a required time of arrival (RTA) control system can relatively rapidly provide accurate aircraft target speeds in response to RTA waypoint entry data and data representative of the RTA itself. Also in accordance with the invention, the RTA control system can provide target speeds which represent the "most fuel efficient" speeds which can be utilized, while still meeting the requisite RTA. An RTA control system in accordance with the invention utilizes an equivalent range approximation which can be characterized as an assumption that the distance travelled along a particular flight profile will remain substantially constant, independent of the particular cost index utilized. With respect to the distance travelled along a flight profile, this equivalent range approximation can be expressed as follows:

$$[V_{AVG}]_{EST} \times T_{EST} = [V_{AVG}]_{CUR} \times T_{CUR} \quad \text{(Equation 3)}$$

where $T_{CUR}$ represents the time of flight to a particular destination (or waypoint) utilizing the current cost index. This current cost index can be generated by the flight management computer system on the basis of "full" flight profile predictions. Correspondingly, $[V_{AVG}]_{CUR}$ represents the average ground speed calculated utilizing the current cost index, again from full flight profile predictions. $T_{EST}$ represents the time of flight utilizing an estimated cost index. Finally, $[V_{AVG}]_{EST}$ represents the average ground speed calculated utilizing the estimated cost index.

Rearranging Equation 3 for purposes of solving for the estimated time of flight at an estimated cost index yields the following:

$$T_{EST}=[V_{AVG}]_{CUR}/[V_{AVG}]_{EST} \times T_{CUR} \qquad \text{(Equation 4)}$$

As apparent from Equation 4, the time of flight at the new estimated cost index can be characterized as being directly proportional to the time of flight calculated from the current full flight profile predictions. This estimated time of flight is a function of the ratio of average ground speed calculated at a current cost index, to the estimated average ground speed at the new estimated cost index.

Utilizing the foregoing concept of an equivalent range approximation, a relatively simplified and rapidly operating RTA control system can be achieved for purposes of obtaining a cost index (and, correspondingly, target speed) meeting particular time constraints employed, for example, in an air traffic control metering system. A relatively simplified version of an RTA control system in accordance with the invention is shown as control system 200 in FIG. 6. The RTA control system 200 can essentially be implemented with the on-board computer of the flight management computer system. Accordingly, the RTA control system 200 is symbolically illustrated as including a flight profile predictor 202. The flight profile predictor 202 utilizes the flight plan and other data (such as speed limits) entered by the pilot, or otherwise, for purposes of providing flight profile predictions. As previously described, flight management computer systems are known which can generate relatively accurate flight profile predictions, while taking into account lateral and vertical flight plans, aircraft limits and predicted atmospheric conditions. As also previously described, flight management computer systems are known which utilize the cost index (CI) parameter as entry data describing a relative cost ratio between flight time and fuel consumption. As further shown in FIG. 6, the flight profile predictor 202 is responsive to data representative of the flight plan, constraint parameters (such as speed limits) and a cost index to generate flight profile prediction data. Among this data, and illustrated in FIG. 6 as being generated on symbolic line 204, are signals representative of an estimated time of arrival (ETA). Also generated as output data, and as illustrated in FIG. 6 as being generated on symbolic line 206, are signals representative of a target speed for pilot control of the aircraft, so as to meet the flight plan and entered constraints, while still achieving a relatively fuel efficient flight.

In addition to generating signals representative of estimated time of arrival and requisite target speed, the flight profile predictor 202 can also generate signals representative of the average ground speed, shown as $V_{avg}$ on line 208 in FIG. 6. It should be emphasized that the use of a flight profile predictor responsive to flight plan input data, constraint data and cost related factors such as a cost index, is relatively well known. Again, such a flight management computer system has been implemented on the Boeing 737 aircraft.

Further in accordance with the invention, the RTA control system 200 is responsive to data representative of a required time of arrival (RTA) applied as input signals on symbolic line 210. These input signals on symbolic line 210 are applied to a differencing or comparator circuit 212 as shown in FIG. 6. It should again be emphasized that the differencing or comparator circuit 212 can be symbolic in nature, and actually implemented by means of computer software. Also applied as input signals to the differencing or comparator circuit 212 are signals representative of estimated time of arrival on symbolic line 204. The differencing or comparator circuit 212 is responsive to the signals representative of the required time of arrival and the estimated time of arrival to generate a time error signal $T_{err}$ on symbolic line 214. This time error signal $T_{err}$ represents the difference between the estimated time of arrival (given the current target speed, cost index and similar data) and the required time of arrival desired by the pilot or air traffic control.

As further shown in FIG. 6, the signals representative of the time error $T_{err}$ are applied from symbolic line 214 as input signals to a cost index predictor circuit 216. The cost index predictor circuit 216 is essentially functional in nature, with the functional operation preferably being implemented by means of computer software. The predictor 216 is adapted to determine, from database or similar data substantially corresponding to the curve of FIG. 5, the estimated cost index which will essentially "force" the estimated time of arrival (ETA) to be substantially equal to the required time of arrival (RTA). The concepts associated with this determination of the estimated cost index will be explained in greater detail in subsequent paragraphs herein.

When the appropriate estimated cost index has been determined, this cost index, illustrated in FIG. 6 as $CI_{EST}$, is applied as an output signal from the cost index predictor 216 on symbolic line 218. The estimated cost index signal $CI_{EST}$ is then applied as an input to the flight profile predictor 202. With this new estimated cost index, a "full" flight profile prediction is regenerated. With the regeneration of the flight profile prediction, a new target speed will be applied as output signals on symbolic line 206. The foregoing describes an extremely simplified version of the RTA control system 200 in accordance with the invention. As described in subsequent paragraphs herein, a physically realized RTA control system in accordance with the invention can include various other aspects. For example, in a practical implementation of the control system, the estimated value of the ETA cannot typically be made exactly equal to the desired required time of arrival. Accordingly, the cost index predictor 216 is preferably adapted to generate a new estimated cost index based on the corresponding ETA being obtained within certain limits of the required time of arrival. Also, if such limits were not employed, the control loop of the RTA control system 200 illustrated in FIG. 6 would be substantially continuously active. By introducing certain time constraint limits for the time error between the predicted estimated time of arrival and the required time of arrival, stability is provided within the control loop of the RTA control system 200, and throttle activity for operating the aircraft will be reduced.

In the foregoing description of the RTA control system 200 in accordance with the invention, the functional operation of the system (and, in particular, the cost index predictor 216) does not include any constraints on the predicted values of the cost indices. However, in a practical implementation of the RTA control system 200 in flight management computer systems, the cost index preferably is considered bounded. For example, in the previously referenced DeJonge patent, the cost index is described as having a value between 0 and 200.

By defining cost index boundaries representing the "lowest" cost index and the "highest" cost index, the estimated times of arrival available to the aircraft with respect to a particular RTA waypoint will correspondingly be bounded. More specifically, utilizing the highest cost index will essentially result in obtaining the earliest "attainable" estimated time of arrival. Correspondingly, utilization of the "lowest" cost index will correspondingly result in a derivation of the latest attainable estimated time of arrival. When computing the time error between the entered data representative of the required time of arrival and the calculated estimated time of arrival for purposes of modifying the cost index and, correspondingly, the target speed, it is advantageous to first determine the "first" and "last" time limits representative of the earliest and latest estimated times of arrival based on the RTA waypoint and the boundary limits of the cost index. Accordingly, the RTA control system 200 illustrated in FIG. 7, in a physically realizable system, can be modified so as to correspond to the RTA control system 220 illustrated in FIG. 7. Again, the control system 220 illustrated in FIG. 7, like the control system 200 illustrated in FIG. 6, is essentially symbolic in nature and primarily represents functions which preferably are performed in substantial part by computer software. Specifically, the RTA control system 220 illustrated in FIG. 7 represents the use of constraint limits for the cost index to determine if, in fact, it is possible to control the cost index and corresponding target speed of the aircraft so as to provide for the estimated time of arrival to converge toward the required time of arrival.

Referring specifically to FIG. 7, the control system 220 is adapted to receive what can be characterized as "RTA waypoint" data representing the navigational coordinates of the particular metering fix to be met by the aircraft. As earlier described, the waypoint data will be provided by the aircraft controller, or by similar means, and entered into the RTA control system 220 by the pilot. Also, it is possible for such waypoint data to be entered into the onboard control system 220 by other means, such as telemetry. With the RTA waypoint data, and data representative of the average ground speed $V_{AVG}$ from the flight profile predictor 202 as shown on symbolic line 208, the RTA control system 220 is adapted to determine an estimated time of arrival based on minimum and maximum boundaries of the cost index.

In general, the RTA control system 220 includes a functional circuit 222 responsive to the navigational coordinates of the RTA waypoint and the maximum and minimum boundary limits of the cost index, in addition to average ground speed as provided by the flight profile predictor 202, so as to compute what can be characterized as a "time window" representing the first and last times that the aircraft could reach the RTA waypoint, with the current lateral and vertical flight profile as provided by the flight profile predictor 202. These functional operations are illustrated in FIG. 7 as being performed by the flight time limits determination circuit 222. More specifically, with reference to FIG. 7, the minimum and maximum cost index limits are entered into the control system 220 as data for use by the flight time limits determination circuit 222. This data is shown as being applied as input data on symbolic line 224. Although it is possible for aircraft personnel to enter such data during flight, the boundary limits for the cost index are preferably stored as data within the original database utilized by the flight management computer system. Correspondingly, the RTA waypoint data, representative of navigational coordinates of the waypoint, are shown as being applied as input data on symbolic line 226.

The flight time limits determination circuit 222 is functionally and symbolically illustrated in FIG. 7 as applying an output signal on symbolic line 228 representative of the last time of the estimated time of arrival, given the boundary limits for the cost index. Correspondingly, signals representative of the earliest estimated time of arrival are symbolically shown in FIG. 7 as being applied as output signals on symbolic line 231. Signals representative of the earliest and latest estimated times of arrival are applied from symbolic lines 231 and 228, respectively, as input signals to a comparator circuit 230. Also applied as input signals to the comparator circuit 230 are signals representative of the required time of arrival. These signals are shown as being applied on symbolic line 232. The comparator 230 is adapted to compare the required time of arrival with the "window" formed by the earliest and latest estimated times for arrival. If the required time of arrival falls within the earliest and latest time limits for the estimated time of arrival, a control signal can be applied on symbolic line 234, as an output signal from the comparator 230. This control signal can be adapted to "close" the symbolic switch 235 also illustrated in FIG. 7. Correspondingly, if the required time of arrival falls "outside" of the window formed by the earliest and latest estimated times of arrival, the comparator 230 can be adapted to apply another appropriate control signal on line 234 so as to "open" the symbolic switch 235.

If the symbolic switch 235 is "closed" (representative of the required time of arrival falling within the time limits for the estimated time of arrival), closed-loop control is provided within the RTA control system 220. That is, the control system 220 will operate so as to determine an appropriate cost index (and corresponding target speed of the aircraft) so that the estimated time of arrival will substantially meet the required time of arrival. On the other hand, if the required time of arrival falls outside of the limits determined for the earliest and latest estimated times of arrival, given the boundary constraints for the cost index, the symbolic switch 235 will remain "open."Accordingly, closed-loop control will not be performed by the RTA control system 220. In a physical realization of the system, the occurrence or nonoccurrence of the required time of arrival falling within the earliest and latest estimated times of arrival will be provided as data to aircraft personnel If the required time of arrival cannot be met by the aircraft, aircraft personnel can take appropriate action at that time.

More specifically, the earliest estimated time of arrival is computed by estimating the flight time for the maximum permissible cost index That is, in accordance with the previously described equations, the earliest estimated time of arrival can be characterized as:

$$T_{MIN} = [V_{AVG}]_{CUR} / [V_{AVG}]_{MAX} \times T_{CUR} \qquad \text{(Equation 5)}$$

where $T_{MIN}$ represents the earliest estimated time of arrival, $[V_{AVG}]_{CUR}$ represents the average ground speed utilizing the current cost index, $[V_{AVG}]_{MAX}$ represents the average ground speed based on the maximum permissible cost index, and $T_{CUR}$ represents the estimated time of arrival utilizing the current cost index. Correspondingly, the latest estimated time of arrival is determined by estimating the flight time for the lowest permissible cost index. That is, the latest estimated time of arrival is determined in accordance with the following:

$$T_{MAX} = [V_{AVG}]_{CUR}/[V_{AVG}]_{MIN} \times T_{CUR} \quad \text{(Equation 6)}$$

where $[V_{AVG}]_{MIN}$ represents the average ground speed based on minimum permissible cost index. In accordance with the foregoing, with the use of the FL time limits determination circuit 222, and the calculation of the earliest and latest estimated times of arrival in accordance with the foregoing, a "time window" estimate is made available to the aircraft pilot relatively quickly after designation of an RTA control waypoint in the flight plan for the pilot. As earlier described, if the designated required time of arrival falls outside of the time window formed by the earliest and latest estimated times of arrival, appropriate data can be displayed to the aircraft pilot and appropriate action taken, either by communication with the aircraft controller or otherwise.

As earlier described, the time error $T_{ERR}$ is applied as an input signal to the cost index predictor circuit 216, along with the estimated time of arrival and the average ground speed. Signals representative of this data are utilized by the cost index predictor circuit 216 for purposes of determining an estimated cost index which will meet the time constraints imposed by the designated required time of arrival. As also earlier described, the cost index will typically have upper and lower bounds associated therewith. In "searching" for an estimated cost index meeting the time constraint of the designated required time of arrival, various types of search procedures can be utilized. For example, a binary search procedure can be utilized, whereby a search is made from the current cost index to the upper or lower bound for the cost index. Correspondingly, the estimated time of arrival for the "midpoint" cost index is then compared to the required time of arrival, and the "next" upper or lower bound of the cost index is reset to the midpoint cost index, dependent upon the sign of the error. This process can then repeated until the estimated time of arrival and the designated required time of arrival are within a predetermined time tolerance. As earlier mentioned, the resultant cost index is then substituted for the current cost index, thereby generating a revised target speed command for the aircraft pilot. In addition, this substitution of the resulting estimated cost index will then cause a regeneration of the full flight profile predictions.

With respect to physical realizations of the control systems 200 and 220 in accordance with the invention, and in accordance with conventional control system theory, the functions performed by the cost index predictor circuit 216 can potentially result in stability problems. In addition, if the control system 220, as shown in FIG. 7, is required to "match" the estimated time of arrival with the required time of arrival within an extremely close tolerance, a substantial number of target speed changes may be generated by the control system 220. To prevent instability and to reduce throttle activity, a "dead-band" in the time error between the predicted estimated time of arrival and the designated required time of arrival can be introduced within the RTA control system 220. A modified RTA control system, employing principles of dead-band control, is illustrated in FIG. 8 as RTA control system 240.

With reference to FIG. 8, it can first be assumed that the designated required time of arrival is within the time limits representative of the earliest estimated time of arrival and the latest estimated time of arrival as determined by the flight time limits determination circuit 222. With this assumption, the time error signal $T_{ERR}$ on symbolic line 214 is applied as an input signal via symbolic line 244 to a dead-band control circuit 242. Also applied as an input signal to the dead-band control circuit 242 is the then currently determined estimated time of arrival. As with other circuitry illustrated with respect to the RTA control systems 200 and 220, the dead-band circuit 242 can be substantially functional in nature, and can preferably be implemented primarily by means of computer software.

The dead-band control circuit 242 is adapted to determine whether the time error $T_{ERR}$ is within or outside of a predetermined dead-band "window." If the time error $T_{ERR}$ falls within the time constraints of the dead-band window, appropriate control signals are applied as output signals from the dead-band control circuit 242 on symbolic line 246 so as to "open" the symbolic switch 248. Accordingly, the RTA control system 240 is then maintained in an open loop configuration, with no further regeneration of cost indices. In this manner, stability of the control system loop is enhanced and throttle activity for adjusting aircraft target speeds is substantially reduced.

Alternatively, if the time error $T_{ERR}$ falls outside of the dead-band window, closed loop operation is maintained. Accordingly, appropriate control signals are generated from the dead-band control circuit 242 and applied on line 246 so as to "close" the symbolic switch 248, thereby maintaining a closed loop configuration. That is, with the symbolic switch 248 in a closed position, the time error signal $T_{ERR}$ is applied as an input signal to the cost index predictor circuit 216.

Figure 9:
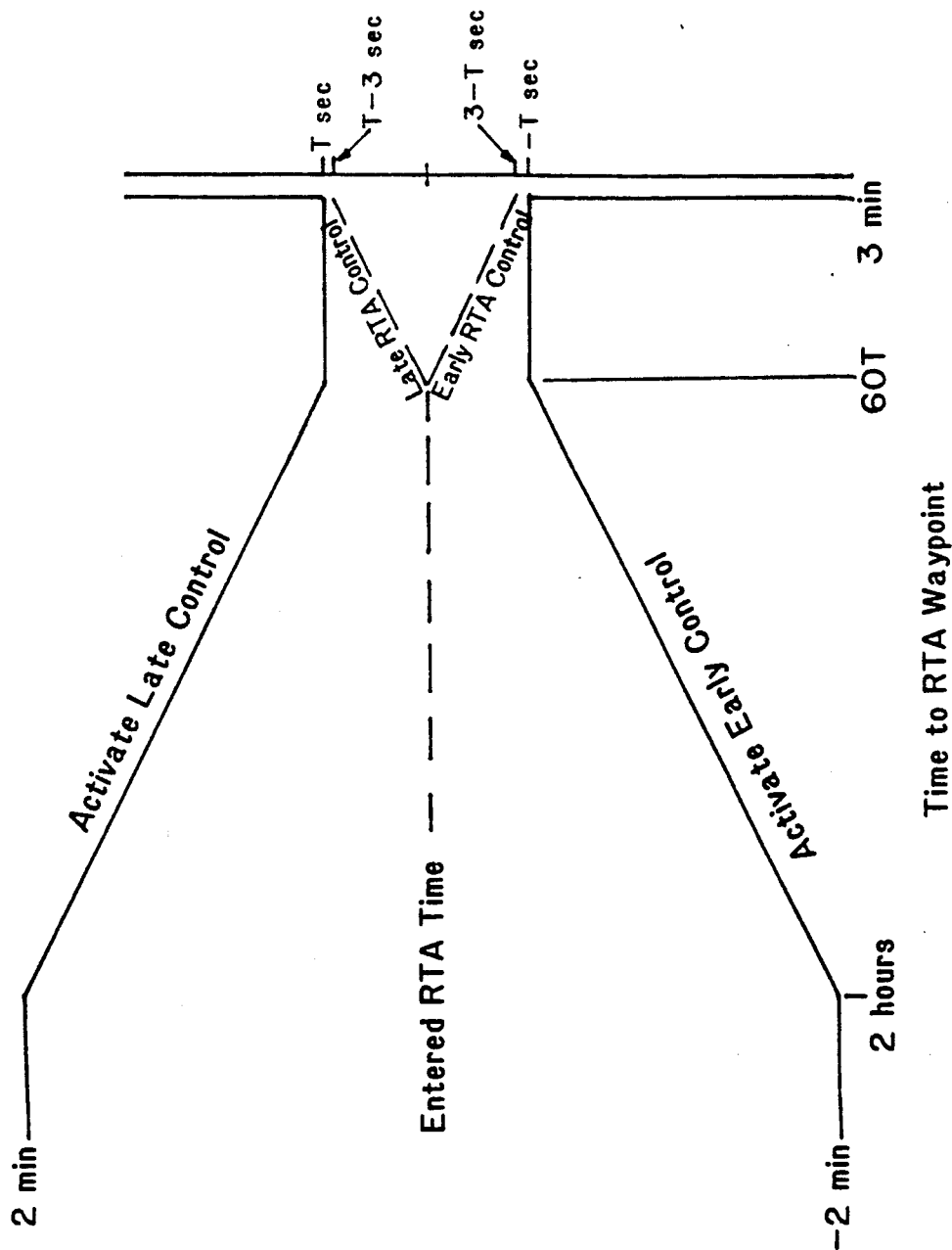
FIG. 9 is an illustration of a dead band arrangement which may be utilized with an RTA control system in accordance with the invention.

Various types of dead-band configurations can be employed with the RTA control system 240, without departing from the principles of the invention. One type of dead-band configuration which may be employed with the RTA control system 240 in accordance with the invention is illustrated in FIG. 9. As shown therein, the width of the dead-band (with respect to time) is variable, and dependent upon the remaining time of flight required to attain the RTA waypoint. In the specific example illustrated in FIG. 9, the dead-band is maintained at a width of plus or minus 2 minutes for remaining flight times exceeding 2 hours. For remaining flight times of less than 2 hours, the dead-band window illustrated in FIG. 9 is, in part, a function of the remaining flight time and in part a function of the tolerance time utilized by the cost index predictor circuit in comparison of the estimated times of arrival and the required times of arrival. In the particular dead-band window embodiment illustrated in FIG. 9, the tolerance time is shown as time T. For flight times of less than 2 hours, but greater than 60 multiplied by the tolerance time T, the dead-band is a linear function. In the particular example of FIG. 9, the linear function provides for the dead-band value to be equal to 1.67% of the remaining flight time. Dependent upon the ground speed of the aircraft, this value would essentially correspond to a speed in the range of 5 to 8 knots.

For flight times of less than 60 times the time tolerance T, but greater than 3 minutes, the dead-band is illustrated in FIG. 9 as being fixed at the tolerance time T. Correspondingly, the RTA control time for the cost index predictor is modified, by adding or subtracting 1.67% of the time past the fixed dead-band point, depending upon which side of the dead-band activated the cost index prediction process. With this arrangement, sufficient control is maintained so as to stay within the allowable tolerance. Correspondingly, for flight times which are within 3 minutes of the RTA waypoint, the RTA control system operates in an open loop configuration. With a flight time of less than 3 minutes, it is essentially "too late" to effectively make any further speed corrections having any significance or impact upon the flight. Although a particular arrangement for implementing the dead-band procedure for use with an RTA control system in accordance with the invention has been described and illustrated in FIG. 9, it is apparent that numerous other dead-band methods could be employed, without departing from the novel concepts of the invention.

Figure 10:
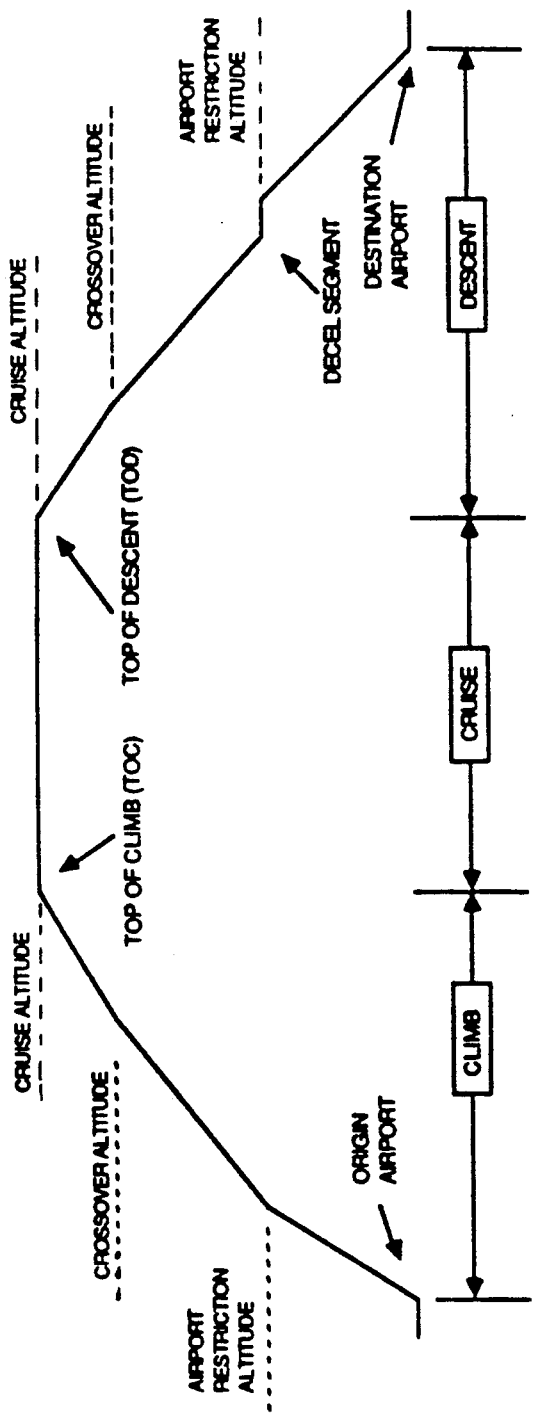
FIG. 10 is an illustration of a typical economy flight profile which may be utilized with an RTA control system in accordance with the invention.

With respect to another aspect of an RTA control system in accordance with the invention, the prior description makes clear that computation of average ground speed is necessary for use with the flight profile predictor and the RTA control systems in accordance with the invention. However, in a physical realization of an RTA control system in accordance with the invention, the computation of average ground speed essentially requires separation of the flight profile into several segments. FIG. 10 shows an illustrative embodiment of segments which may be utilized for a typical economy flight profile. These segments include the following: climb below airport speed restriction; climb above airport speed restriction, but before a crossover altitude; climb above crossover altitude; cruise; descent above crossover altitude; descent below crossover altitude and before airport speed restriction; and descent below airport restriction speed.

For each segment, an average ground speed is computed, corresponding to the average of the true airspeed at various locations along the segment, including any track wind component. For each segment, a "speed ratio" can be computed, by dividing the average ground speed at the current cost index by the estimated average ground speed at the new estimated cost index. This speed ratio can then be multiplied by the "segment time", and the segment flight times summed in accordance with the following:

$$T_{EST} = [V_{AVGi}]_{CUR}/[V_{AVGi}]_{EST} \times [T_i]_{CUR} \quad \text{(Equation 7)}$$

where i corresponds to each segment value, and n is equal to the total number of segments.

Figure 11:
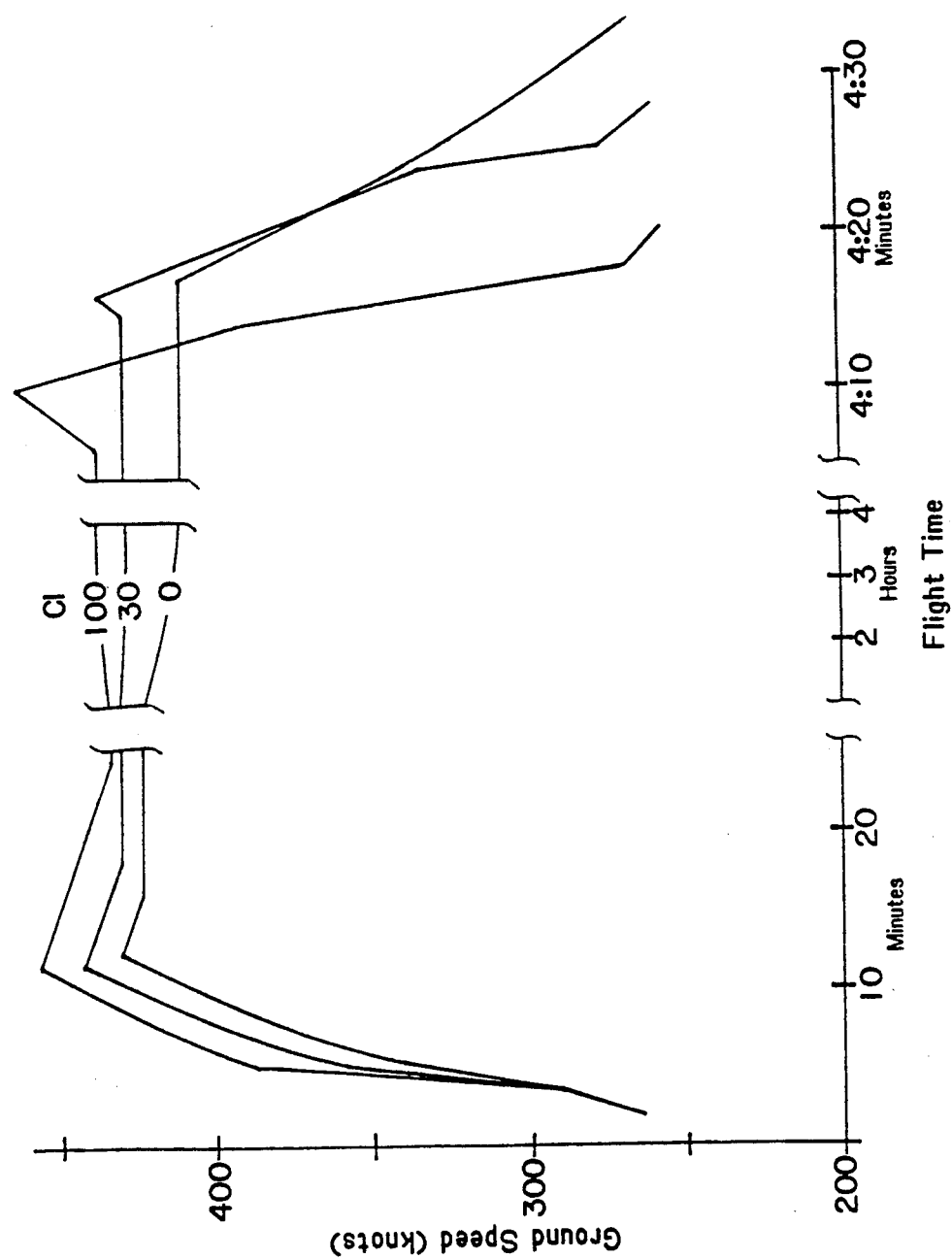
FIG. 11 is an illustration of a typical ground speed profile which may be utilized with an RTA control system in accordance with the invention.

In accordance with the foregoing, an average ground speed must be determined for each of the segments. FIG. 11 depicts an example ground speed profile with respect to the segments, and further shows example cost indices. As apparent from FIG. 11, ground speed is substantially linear for each segment, except for the cruise segment. Accordingly, for purposes of determining average ground speed for climb and descent segments, the beginning and ending ground speeds are merely averaged. However, with respect to the cruise segment, non-linearity exists for "minimum cost" speeds. That is, the minimum cost cruise speeds will vary non-linearly with, for example, gross weight. That is, the gross weight of the aircraft may substantially change during a relatively long cruise segment as additional fuel is consumed. Therefore, additional segment points are required to compute a relatively accurate average ground speed. To compensate for this non-linearity, the cruise portion of the flight can be divided into a plurality of segments. For example, experimentation has shown that for cruise segments of up to 2000 nautical miles, relative accuracy in determining the estimated flight times can be achieved by characterizing the cruise segment as two separate segments, separated at the mid-point. However, various other arrangements can be employed for purposes of compensating for the non-linearity.

In further explanation of the concept of obtaining ground speeds at the various segment break points, these computations are relatively straight forward in many flight management computer systems. For example, cost index-based speed schedules have been modeled as polynomial expressions of gross weight, altitude and wind. The results of dynamic optimization of many flight profiles are expressed as polynomials, with the coefficients obtained through regression analysis. Further, flight management computer systems can be adapted to calculate the gross weight, altitude, time, airspeed and wind at each segment break point, with storage of this information in a current flight plan buffer or data storage area. In accordance with the foregoing, with the input variable being expressed as a desired cost index, and with use of the data representative of weight, altitude and wind from a current flight plan buffer, a relatively rapid determination of airspeed can be obtained. Still further, it is preferable to include within the computations speed limiting and buffet boundaries for purposes of insuring that the airspeed computations at the segment evaluation points are maintained within these boundary limits.

With the RTA control systems described herein in accordance with the invention, and as previously described, it is preferable to include a dead-band window within the dynamic cost index prediction procedure. As also previously described with respect to an exemplary dead-band arrangement (as illustrated in FIG. 9), a time tolerance T may be utilized. The use of such a time tolerance allows for some flexibility in the air traffic control environment, with respect to time control accuracy at meter fixes. Although this time tolerance can be potentially fixed and "built in" to the system, it may be preferable to allow pilot entry of a variable tolerance. Where metering points exist en route, aircraft-to-aircraft spacing is relatively large. Accordingly, a relatively high time tolerance could be utilized, e.g. 30 seconds. In contrast, in a terminal area where it is desireable to increase airport capacity through closer aircraft spacing, a lower time tolerance may be preferable, e.g. 6 seconds. Further, in a physically realized RTA control system in accordance with the invention, a default tolerance may be employed between high and low tolerance entry boundaries. As described with respect to the dead-band window arrangement, the time tolerance can be utilized to determine when and if closed-loop operation of the RTA control system should be activated.

As also previously described with respect to FIGS. 1, 2 and 3, the on-board computer system 100 of the aircraft preferably includes a control and display unit 102. Information associated with operation of the RTA control system can be provided to the pilot by means of this display. FIG. 12 illustrates an example display which may be utilized with an RTA control system in accordance with the invention. In the particular example illustrated in FIG. 12, the RTA provided to the pilot is "unachievable", since the RTA falls 1 minute and 30 seconds after the "last" potential estimated arrival time. As previously described, this latest estimated arrival time is computed by utilizing the RTA control system with the minimum cost index boundary limit. Since the RTA is unachievable, a time error message is presented to the pilot, indicating that with the latest estimated time of arrival, the aircraft will arrive at the RTA waypoint 1 minute and 30 seconds earlier than the RTA. With the latest estimated arrival time being earlier than the RTA, this information presented to the pilot can be utilized for activities such as delay absorption maneuvers. With such maneuvers, where the aircraft would leave the established flight path, a "direct-to" type leg can be assumed to rejoin the flight path at a future segment point. By continuously monitoring the message to the pilot indicating the "early" estimated arrival time, the pilot is provided with sufficient data so as to determine when to initiate the "direct-to" maneuver, so as to achieve arrival at the RTA waypoint within the designated control window.

As well known to those involved in the design of flight management systems, wind conditions are of primary importance in providing a relatively accurate flight profile. Accordingly, known flight management computer systems typically provide a flight profile having a predicted wind for each of the lateral or vertical waypoints. This information is typically derived from forecast wind data entered by the pilot. This data is typically propagated along the flight profile, and adjusted for altitude based on known atmospheric characteristics.

For purposes of determining average wind conditions, wind components can be summed for each leg of the flight profile. Correspondingly, the head wind or tail wind component of the wind prediction at the start and end of each leg segment can be averaged, and weighted by the amount of time that the particular wind segment will act on the aircraft. With the foregoing, an average wind calculation can be made in accordance with the following:

$$\text{Average Wind} = [(WIND_{end} - WIND_{start})/2 \times (ETA_{end} - ETA_{start})]/(ETA_{last} - ETA_{first}) \quad \text{(Equation 8)}$$

where n represents the particular leg segment of the flight profile, $WIND_{end}$ is equal to the wind component of the predicted wind at the end of the leg, $WIND_{start}$ is equal to the component of the wind prediction at the start of the leg, $ETA_{end}$ is the estimated time of arrival at the end of the leg, $ETA_{start}$ is the estimated time of arrival at the start of the leg, $ETA_{last}$ is the estimated time of arrival for the immediately-preceding waypoint, and $ETA_{first}$ is the estimated time of arrival for the first waypoint. This average wind component can then be utilized for more accurately determining estimated times of arrival and the appropriate cost index for attaining an estimated time of arrival substantially equal to the required time of arrival.

With the advantages associated with relatively rapid estimation of arrival times with the RTA control systems in accordance with the invention, several types of errors may be inherent in the control system operation. For example, one type of error source relates to accuracy of flight path distance. If the aircraft is involved in making turns of greater than 90°, path distance error may be significant. To overcome this type of error, it is possible to include a distance "correction factor" within the appropriate computations. For example, a distance correction factor can be modeled for various types of turns which may be performed by the aircraft. This correction factor can then be utilized to correct potential path distance error.

Another potential type of error relates to acceleration segments for the aircraft. Although the errors which may exist within the RTA control system computations would be minor for computations made when the aircraft is a substantial distance from an RTA waypoint, this potential error source may become significant when the aircraft is relatively close to the waypoint. Also, acceleration segment errors may result in significant time errors for computations associated with determining the first and last estimated times of arrival. To compensate for such errors, an acceleration correction factor can be added into the computations for speed changes which are significant. Again, this correction factor can be utilized by the RTA control system in making its determinations related to estimated times of arrival and cost indices.

Another type of error which may exist relates to segment breakpoint locations. More specifically, relatively minor differences may exist in adjacent time speeds, over the amount of time shift. To compensate for these types of errors, a segment correction factor can be provided for the "top" of the climb segment, and the "top" of the descent segment.

Another potential source of errors relates to gross weight calculations. That is, completely accurate target speeds would be dependent in part on fuel consumption differences associated with the current flight profile and the new flight profile utilizing an adjusted cost index and target speed. However, it is believed that the errors associated with these gross weight differences would be relatively small.

Wind conditions can also be a factor in errors associated with the RTA control system. That is, minor changes may exist in the effective wind components with respect to flight profiles having differing altitudes. In addition, deceleration segments may also be a contributing factor to potential errors. However, each of these error sources is relatively minor. In particular, errors associated with deceleration segments will be very small, unless the aircraft is extremely close to the RTA waypoint. However, in such instances, any changes in target speeds would likely have a negligible effect on the estimated time of arrival.

Another error source is associated with the linear average speed approximation. Although this error source may at first appear substantial, errors resulting from this approximation will essentially tend to "cancel out" in the computations employing ratios of average speed. Again, these error sources exist primarily in that parameters such as weight, altitude, wind and location of segment breakpoints may be somewhat different for the estimated cost index.

Figure 13:
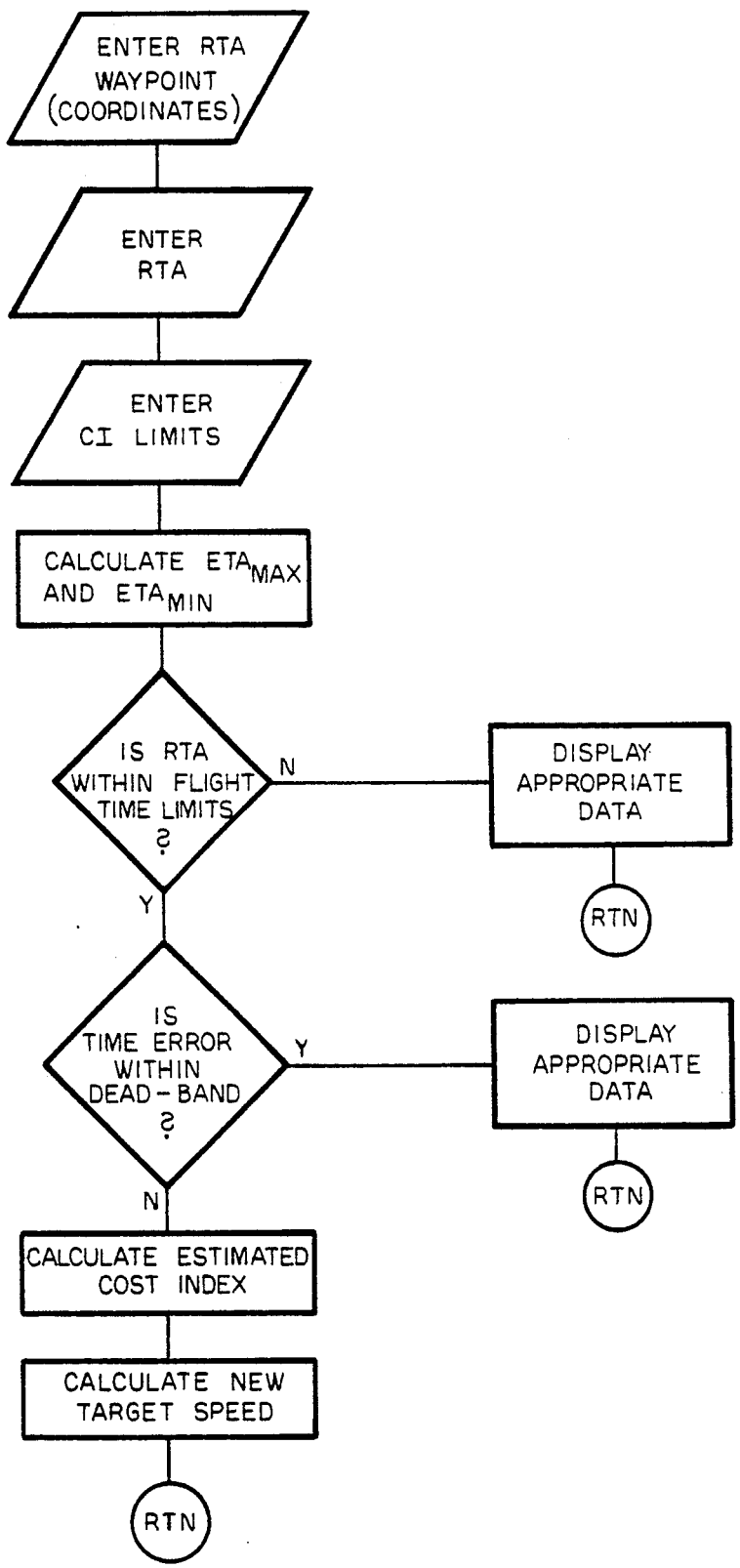
FIG. 13 is a general sequence diagram illustrating functions associated with operation of the RTA control system illustrated in FIG. 6 in accordance with the invention.

For purposes of summary, FIG. 13 is an extremely simplified sequence diagram of functions which may be performed by an RTA control system in accordance with the invention. As earlier described, RTA waypoint data (in the form of navigational coordinates) can be entered into the system. In addition, an actual required time of arrival can also be entered into the system. As previously described, such required time of arrival data can be entered by means of the pilot or by alternative means, such as telemetry.

Following entry of the cost index limits, first and last time limits for the estimated times of arrival can be determined. The earliest estimated time of arrival can be determined by utilizing the previously-described equations with the maximum cost index boundary. Correspondingly, the latest time of arrival can be determined by utilizing the minimum cost index boundary.

Following determination of the first and last limits for the estimated times of arrival, a determination can then be made as to whether the designated time of arrival falls within these time limits. If not, the RTA control system is made to operate in an open loop configuration, and appropriate data can be displayed to the pilot. On the other hand, if the RTA falls within the limits for the estimated times of arrival, a further determination can be made as to whether the current time error falls within the dead-band window. If so, appropriate data can again be displayed to the pilot, and the RTA control system will be maintained in an open loop configuration.

If the required time of arrival falls within the limits for the estimated times of arrival, and the time error is not within the dead-band window, closed loop operation of the RTA control system can then be made to occur. In accordance with the previously-described equations, a search can then be made for a new estimated cost index meeting the time constraint for the designated required time of arrival. As also previously described, a search technique such as a binary search from the current cost index to upper/lower cost index boundary values can be made. The estimated time of arrival based on the new estimated cost index can then be compared to the designated required time of arrival, and the search process continued until the estimated time of arrival associated with the estimated cost index is within a predetermined value of the required time of arrival. Following the determination of the new estimated cost index, this new index is substituted for the current cost index, thereby generating a revised target speed. Correspondingly, regeneration can also be made of full flight profile predictions.

In accordance with the invention, and in accordance with the exemplary embodiment described herein, relatively accurate modifications to aircraft target speeds can be made rapidly in response to designated required times of arrival at geographical locations along the flight path. An RTA control system in accordance with the invention utilizes the cost index for purposes of "time control." Such utilization of the cost index is advantageous in that the cost index affects climb, cruise and descent in a manner resulting in a minimum fuel flight profile for the corresponding flight time.

It will be apparent to those skilled in the pertinent arts that other embodiments of RTA control systems in accordance with the invention can be provided. That is, the principles of a required time of arrival control system in accordance with the invention are not limited to the specific embodiments described herein. It will be apparent to those skilled in the art that modifications and other variations of the above-described illustrative embodiments of the invention may be effected without departing from the spirit and scope of the novel concepts of the invention.

The embodiments of the invention in which an exclusive property or privilege is claimed are defined as follows:

1. In an aircraft having flight management processing means responsive to input data signals representative of a flight plan, aircraft limits and predicted atmospheric conditions, and further responsive to a cost index parameter indicative of a cost relationship between flight time and fuel consumption for the aircraft, wherein said flight management processing means is adapted to generate predicted flight profile data, including target aircraft speeds and estimated times of arrival, the improvement comprising a required time of arrival (RTA) control system for rapidly determining adjustments in airspeed required to meet a desired crossing time at a selected waypoint, the required time of arrival control system comprising:

input means for receiving data signals representative of a required time of arrival corresponding to said desired crossing time at said selected waypoint;

cost index processing means responsive to said data signals representative of said required time of arrival for determining an estimated cost index parameter comprising an estimate of said cost index parameter, which will provide a flight time substantially corresponding to said required time of arrival, said cost index processing means comprising means for computing said estimated cost index parameter on the basis that the distance travelled between a current position and said selected waypoint is substantially independent of said cost index parameter; and means responsive to said data signals representative of said estimated cost index parameter for generating data signals representative of a target airspeed required to meet said flight time substantially corresponding to said required time of arrival.

2. A required time of arrival control system in accordance with claim 1 characterized in that said system further comprises:

processing means responsive to data signals representative of a minimum permissible cost index parameter and navigational coordinates of said selected waypoint for generating data signals representative of a latest time of arrival at said selected waypoint; and processing means responsive to data signals representative of a maximum permissible cost index parameter and navigational coordinates of said selected waypoint for generating data signals representative of an earliest time of arrival at said selected waypoint.

3. A required time of arrival control system in accordance with claim 2 characterized in that said cost index processing means is further responsive to said data signals representative of said minimum and maximum cost index parameters so as to determine said estimated cost index parameter only within boundaries formed by said minimum and maximum cost index parameters.

4. A required time of arrival control system in accordance with claim 2 characterized in that said system further comprises:

means for comparing data signals representative of said required time of arrival with data signals representative of said earliest estimated time of arrival and said latest estimated time of arrival; and means for inhibiting operation of said cost index processing means in the event that said required time of arrival is outside of boundaries formed by said earliest and latest estimated times of arrival.

5. A required time of arrival control system in accordance with claim 4 characterized in that said system further comprises display means for displaying to an aircraft pilot data representative of said required time of arrival falling within or outside of said boundaries formed by said earliest and latest estimated times of arrival.

6. A required time of arrival control system in accordance with claim 1 characterized in that said system further comprises input means for receiving data signals representative of an allowable time tolerance for said estimated time of arrival.

7. A required time of arrival control system in accordance with claim 1 characterized in that said cost index processing means comprises:
 a database comprising data representative of remaining flight time and fuel consumption for said aircraft as a function of said cost index parameter; and
 means for performing a binary search from a current value of said cost index parameter to maximum and minimum permissible values of said cost index parameter for purposes of determining said estimated cost index parameter which will provide a flight time substantially corresponding to said required time of arrival.

8. A required time of arrival control system in accordance with claim 7 characterized in that said cost index processing means further comprises:
 comparison means for comparing data signals representative of said required time of arrival with data signals representative of an estimated time of arrival corresponding to a cost index parameter substantially equal to a midpoint between said maximum and minimum permissible values of said cost index parameter; and
 means for determining the sign of the difference between said estimated time of arrival corresponding to said midpoint cost index parameter and said required time of arrival;
 means for setting the minimum permissible cost index parameter or maximum permissible cost index parameter to said midpoint cost index parameter, dependent upon the sign of said difference, and for repeating said comparison of said estimated time of arrival corresponding to the new midpoint cost index parameter and said required time of arrival, and repeating the same until said estimated time of arrival of a midpoint cost index parameter is within a predetermined value of said required time of arrival.

9. A required time of arrival control system in accordance with claim 1 characterized in that said control system further comprises:
 means responsive to data signals representative of said required time of arrival and data signals representative of said estimated time of arrival for generating data signals representing a time error substantially equal to the difference between said required time of arrival and said estimated time of arrival;
 dead-band means responsive to said data signals representative of said time error for generating a dead-band signal indicative of whether said time error falls within or outside of a predetermined dead-band time width; and
 means responsive to said dead-band signal for inhibiting operation of said cost index processing means when said dead-band signal is indicative of said time error falling within said predetermined dead-band time width.

10. A required time of arrival control system in accordance with claim 9 characterized in that said dead-band means is further responsive to data signals representative of the remaining flight time from a current time to said required time of arrival, and said dead-band signal is a function of both said time error and said remaining flight time, with said predetermined time width being a function of said remaining flight time.

11. A required time of arrival control system in accordance with claim 10 characterized in that:
 said system further comprises input means for receiving data signals representative of an allowable time tolerance for said estimated time of arrival; and
 said dead-band means is further responsive to said data signals representative of said allowable time tolerance, and said dead-band signal is, in part, a function of said allowable time tolerance.

12. A required time of arrival control system in accordance with claim 11 characterized in that said predetermined time width is a constant value when said remaining flight time is less than a value which is a function of said allowable time tolerance, but greater than a predetermined fixed time.

13. A required time of arrival control system in accordance with claim 12 characterized in that said system further comprises means for adjusting said required time of arrival when said remaining flight time is less than said value which is a function of said allowable time tolerance, but greater than a predetermined fixed time.

14. A required time of arrival control system in accordance with claim 11 characterized in that said system further comprises means responsive to said data signals representative of said remaining flight time for inhibiting operation of said cost index processing means when said remaining flight time is less than a predetermined fixed time.

15. A required time of arrival control system in accordance with claim 10 characterized in that said predetermined dead-band time width is a constant value when said remaining flight time is greater than a predetermined value.

16. A required time of arrival control system in accordance with claim 1 characterized in that said flight plan is divided into a plurality of segments, including climb, cruise and descent segments, and said system further comprises:
 means for determining a current average ground speed for each of said segments corresponding to said current cost index parameter;
 means for determining an estimated average ground speed for each of said segments corresponding to said estimated cost index parameter;
 means for generating data signals representative of an estimated remaining time of flight for each of said segments, corresponding to a ratio of said current average ground speed to said estimated average ground speed for each of said corresponding segments, multiplied by a predicted remaining time of flight for each of said corresponding segments, and using said current cost index parameter; and
 means for summing said data signals representative of said estimated remaining times of flight for each of said segments, and for generating data signals corresponding to a total remaining time of flight corresponding to said estimated cost index parameter.

17. A required time of arrival control system in accordance with claim 16 characterized in that said average ground speed for said climb and said descent segments is determined as an average of beginning and ending ground speeds for each of said climb and said descent segments.

18. A required time of arrival control system in accordance with claim 16 characterized in that when said cruise segment is greater than a predetermined distance, said cruise segment is divided into a plurality of segments of relatively shorter distance for purposes of computing average ground speeds of said shorter distance segments.

19. A required time of arrival control system in accordance with claim 1 characterized in that:
    said system further comprises means for generating data signals representative of an average wind component; and
    said cost index processing means is further responsive to said data signals representative of said average wind component for determining said estimated cost index parameter.

20. A required time of arrival (RTA) control system for use in an aircraft having a flight management system comprising processing means responsive to input data signals representative of a flight plan, aircraft limits and predicted atmospheric conditions, and further responsive to a cost index parameter indicative of a cost relationship between flight time and fuel consumption for the aircraft, said processing means being adapted to generate predicted flight profile data, including target aircraft speeds and estimated times of arrival, said required time of arrival control system being adapted for rapidly determining adjustments in airspeed required to meet a desired crossing time at a selected waypoint, said required time of arrival control system comprising:
    input means for receiving data signals representative of navigational coordinates of said selected waypoint;
    input means for receiving data signals representative of a required time of arrival corresponding to said desired crossing time at said selected waypoint;
    processing means responsive to data signals representative of a minimum permissible cost index parameter and said navigational coordinates of said selected waypoint for generating data signals representative of a latest time of arrival at said selected waypoint;
    processing means responsive to data signals representative of a maximum permissible cost index parameter and said navigational coordinates of said selected waypoint for generating data signals representative of an earliest time of arrival at said selected waypoint;
    cost index processing means responsive to said data signals representative of said required time of arrival for determining an estimated cost index parameter which will provide a flight time substantially corresponding to said required time of arrival, said cost index processing means comprising means for computing said estimated cost index parameter on the basis that the distance travelled between a current position and said selected waypoint is substantially independent of said cost index parameter;
    said cost index processing means being further responsive to said data signals representative of said minimum and maximum cost index parameters so as to determine said estimated cost index parameter only within boundaries formed by said minimum and maximum cost index parameter;
    means for comparing data signals representative of said required time of arrival with data signals representative of said earliest estimated time of arrival and said latest estimated time of arrival
    means for inhibiting operation of said cost index processing means in the event that said required time of arrival is outside of boundaries formed by said earliest and latest estimated times of arrival; and
    means responsive to said data signals representative of said estimated cost index parameter for generating data signals representative of a target airspeed required to meet said flight time substantially corresponding to said required time of arrival.

21. A required time of arrival control system in accordance with claim 20 characterized in that said required time of arrival control system further comprises:
    means responsive to data signals representative of said required time of arrival and data signals representative of said estimated time of arrival for generating data signals representative of a time error substantially equal to the difference between said required time of arrival and said estimated time of arrival;
    dead-band means responsive to said data signals representative of said time error for generating a dead-band signal indicative of whether said time error falls within or outside of a predetermined dead-band time width; and
    means responsive to said dead-band signal for inhibiting operation of said cost index processing means when said dead-band signal is indicative of said time error falling within said predetermined dead-band time width.

22. A required time of arrival control system in accordance with claim 20 characterized in that said required time of arrival control system further comprises display means for displaying to an aircraft pilot data representative of said required time of arrival falling within or outside of said boundaries formed by said earliest and latest estimated times of arrival, and for displaying additional data representative of said estimated time of arrival.

23. In an aircraft having flight management processing means responsive to input data signals representative of a flight plan, aircraft limits and predicted atmospheric conditions, and further responsive to a cost index parameter indicative of a cost relationship between flight time and fuel consumption for the aircraft, wherein said flight management processing means is adapted to generate predicted flight profile data, including target aircraft speeds and estimated times of arrival, the improvement comprising a method for rapidly determining adjustments in airspeed required to meet a desired crossing time at a selected waypoint, said method comprising:
    receiving data signals representative of a required time of arrival corresponding to said desired crossing time at said selected waypoint;
    determining an estimated cost index parameter, based in part on said data signals representative of said required time of arrival, wherein said estimated cost index parameter will provide a flight time substantially corresponding to said required time of arrival;

determining said estimated cost index parameter on the basis that the distance travelled between a current position and said selected waypoint is substantially independent of said cost index parameter; and generating data signals representative of a target airspeed required to meet said flight time substantially corresponding to said required time of arrival.

24. A method in accordance with claim 23 characterized in that said method further comprises the steps of:

generating data signals representative of a minimum permissible cost index parameter and navigational coordinates of said selected waypoint;

generating data signals representative of a latest time of arrival at said selected waypoint based on said minimum permissible cost index parameter and said navigational coordinates;

generating data signals representative of a maximum permissible cost index parameter; and generating data signals representative of an earliest time of arrival at said selected waypoint based on said data signals representative of a maximum permissible cost index parameter and said navigational coordinates of said selected waypoint.

25. A method in accordance with claim 24 characterized in that said method further comprises the step of determining said estimated cost index parameter only within boundaries formed by said minimum and maximum cost index parameters.

26. A method in accordance with claim 25 characterized in that said method further comprises the steps of:

comprising data signals representative of said required time of arrival with data signals representative of said earliest estimated time of arrival and said latest estimated time of arrival; and inhibiting operation of said cost index processing means in the event that said required time of arrival is outside of boundaries formed by said earliest and latest estimated times of arrival.

27. A method in accordance with claim 26 characterized in that said method further comprises the step of displaying to an aircraft pilot data representative of said required time of arrival falling within or outside of said boundaries formed by said earliest and latest estimated times of arrival.

28. A method in accordance with claim 24 characterized in that said method further comprises the steps of:

generating data signals representative of a time error substantially equal to the difference between said required time of arrival and said estimated time of arrival;

generating a dead-band signal indicative of whether said time error falls within or outside of a predetermined dead-band time width; and inhibiting operation of further determination of said estimated cost index parameter when said dead-band signal is indicative of said time error falling within said predetermined dead-band time width.

* * * * *

UNITED STATES PATENT AND TRADEMARK OFFICE
CERTIFICATE OF CORRECTION

PATENT NO. : 5,121,325
DATED : June 09, 1992
INVENTOR(S) : MICHAEL K. DEJONGE

It is certified that error appears in the above-identified patent and that said Letters Patent is hereby corrected as shown below:

Col. 30, Claim 20, Line 10, after "arrival" insert --;--.

Col. 32, Claim 26, Line 3, "comprising" should be --comparing--.

Signed and Sealed this

Twenty-first Day of September, 1993

Attest:

BRUCE LEHMAN

Attesting Officer     Commissioner of Patents and Trademarks